US009609520B2

(12) United States Patent
Shellhammer et al.

(10) Patent No.: US 9,609,520 B2
(45) Date of Patent: Mar. 28, 2017

(54) METHODS AND APPARATUSES FOR COMMUNICATING IN TELEVISION WHITE SPACE (TVWS) BASED ON TVWS ENABLEMENT SIGNAL

(75) Inventors: Stephen J. Shellhammer, Ramona, CA (US); Cong Shen, San Diego, CA (US); Rahul Tandra, San Diego, CA (US); Santosh Paul Abraham, San Diego, CA (US); Sameer Vermani, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1365 days.

(21) Appl. No.: 13/349,501

(22) Filed: Jan. 12, 2012

(65) Prior Publication Data
US 2013/0016670 A1    Jan. 17, 2013

Related U.S. Application Data

(60) Provisional application No. 61/433,046, filed on Jan. 14, 2011.

(51) Int. Cl.
*H04W 72/04* (2009.01)
*H04W 16/14* (2009.01)
*H04W 84/12* (2009.01)

(52) U.S. Cl.
CPC ............ *H04W 16/14* (2013.01); *H04W 84/12* (2013.01)

(58) Field of Classification Search
CPC . H04W 16/14; H04W 48/16; H04W 72/0426; H04W 72/1215; H04W 72/1278; H04W 72/04; H04W 72/0433; H04W 48/10; H04H 20/42
See application file for complete search history.

(56) References Cited

U.S. PATENT DOCUMENTS

| | | | |
|---|---|---|---|
| 7,277,694 B2 | 10/2007 | Sinnarajah et al. |
| 7,418,042 B2 | 8/2008 | Choi et al. |
| 8,259,830 B1 | 9/2012 | McCloskey et al. |
| 8,290,503 B2 | 10/2012 | Sadek et al. |
| 8,483,155 B1 | 7/2013 | Banerjea et al. |

(Continued)

FOREIGN PATENT DOCUMENTS

| | | |
|---|---|---|
| CN | 1809007 A | 7/2006 |
| CN | 101291317 A | 10/2008 |

(Continued)

OTHER PUBLICATIONS

Kafle P., et al., "TVWS WLAN Enablement—Review and Open Issues",IEEE, 802.11-10/0812r1, IEEE, Aug. 10, 2010, pp. 1-33.

(Continued)

*Primary Examiner* — Hoang-Chuong Vu
(74) *Attorney, Agent, or Firm* — Dang M. Vo

(57) ABSTRACT

Certain aspects of the present disclosure relate to techniques for supporting television white space (TVWS) communication. In an aspect of the present disclosure, a low-rate TVWS enabler (Mode II wireless communication device) may provide initial enablement for all Mode I devices (e.g., access points and user terminals), as well as it may transmit a contact verification signal (CVS) on a regular basis to keep the Mode I devices enabled for the TVWS communication.

121 Claims, 11 Drawing Sheets

(56) References Cited

U.S. PATENT DOCUMENTS

| | | | |
|---|---|---|---|
| 9,055,593 B2* | 6/2015 | Kim et al. | |
| 2005/0147071 A1 | 7/2005 | Karaoguz et al. | |
| 2006/0030318 A1 | 2/2006 | Moore et al. | |
| 2006/0187864 A1 | 8/2006 | Wang et al. | |
| 2008/0152034 A1 | 6/2008 | Liu et al. | |
| 2008/0285514 A1 | 11/2008 | Uchida et al. | |
| 2009/0143019 A1 | 6/2009 | Shellhammer | |
| 2009/0323835 A1 | 12/2009 | Rao et al. | |
| 2010/0048234 A1 | 2/2010 | Singh | |
| 2010/0069013 A1 | 3/2010 | Chaudhri et al. | |
| 2010/0173586 A1* | 7/2010 | McHenry | H04L 27/0006 455/62 |
| 2011/0116458 A1 | 5/2011 | Hsu et al. | |
| 2011/0158147 A1 | 6/2011 | Li et al. | |
| 2011/0187591 A1 | 8/2011 | Walker, Sr. | |
| 2011/0222488 A1* | 9/2011 | Kim et al. | 370/329 |
| 2011/0223930 A1 | 9/2011 | Todd | |
| 2011/0250915 A1 | 10/2011 | Stanforth et al. | |
| 2011/0263209 A1 | 10/2011 | Kasslin et al. | |
| 2012/0008604 A1* | 1/2012 | Kasslin | H04W 48/14 370/338 |
| 2012/0026941 A1* | 2/2012 | Ahmad et al. | 370/328 |
| 2012/0093092 A1* | 4/2012 | Kasslin | H04W 72/082 370/329 |
| 2012/0307817 A1* | 12/2012 | Chen et al. | 370/338 |
| 2013/0016760 A1 | 1/2013 | Shellhammer et al. | |
| 2013/0079046 A1 | 3/2013 | Chen et al. | |
| 2013/0130731 A1* | 5/2013 | Kim | H04W 52/146 455/501 |
| 2013/0142059 A1* | 6/2013 | Di Girolamo et al. | 370/252 |
| 2013/0143613 A1* | 6/2013 | Lee et al. | 455/509 |
| 2013/0163574 A1* | 6/2013 | Seok | H04W 8/005 370/338 |
| 2013/0231108 A1* | 9/2013 | Kim et al. | 455/434 |
| 2014/0003361 A1* | 1/2014 | Song et al. | 370/329 |

FOREIGN PATENT DOCUMENTS

| | | |
|---|---|---|
| JP | 2001320324 A | 11/2001 |
| JP | 2006526368 A | 11/2006 |
| JP | 2008312194 A | 12/2008 |
| JP | 2010109825 A | 5/2010 |
| JP | 2013511235 A | 3/2013 |
| WO | WO-2004039002 A2 | 5/2004 |
| WO | WO-2004105409 A1 | 12/2004 |
| WO | WO-2008086243 A1 | 7/2008 |
| WO | WO2010074471 A2 | 7/2010 |
| WO | WO-2010088586 A2 | 8/2010 |
| WO | WO-2010111150 A2 | 9/2010 |
| WO | WO2011062395 A2 | 5/2011 |
| WO | WO2011126188 A1 | 10/2011 |
| WO | WO2012004449 A1 | 1/2012 |

OTHER PUBLICATIONS

Tandra R., "Low Rate Enabler", IEEE 802.11-11/0364r1, IEEE, Mar. 14, 2011, Qualcomm Inc, pp. 1-28.

IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

IEEE P802.11af/D1.0, Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 2: TV White spaces Operation, pp. 1-159 (Jan. 2011).

International Search Report and Written Opinion—PCT/US2012/021381—ISA/EPO—Apr. 4, 2012.

"Part 11: Wireless LAN Medium Access Control (MAC) and Physical Layer (PHY) specifications Amendment 3: 3650a 3700 MHz Operation in USA ; 11-07-2607-00-000y-tgy-redline-between-Draft—5.0 and 4 .0", IEEE Draft; IEEE-SA, Piscataway, NJ, USA, vol. 802.11y, Sep. 17, 2008, pp. 1-98, XP017646893, [retrieved on Sep. 17, 2008].

Schon, et al., "On the capability of high sensitivity GPS for precise indoor positioning," IEEE, Proceedings of the 5th Workshop on Positioning, Navigation and Communication 2008 (WPNC'08), pp. 121-127, Mar. 2008.

Song, et al., "Autonomous Dynamic Frequency Selection for WLANs Operating in the TV White Space," IEEE Communications Society, IEEE ICC 2011 proceedings, 2011.

Van Diggelen, "Indoor GPS theory & implementation," IEEE Position, Location & Navigation Symposium, 2002, pp. 240-247, Aug. 2002.

Kafle, P., "TVWS Enablement after New FCC Rules", Nokia, doc:IEEE 802.11-10/1226r0, Nov. 2, 2010, 14 pages.

Lansford, J., "802.11 WNG Presentation on Location Awareness", CSR, doc:IEEE 802.11-10/1239r02,Nov. 9, 2010, 8 pages.

* cited by examiner

| Channel Label | Center Frequency | Bandwidth |
|---|---|---|
| A | f1 | BW1 |
| B | f2 | BW2 |
| C | f3 | BW3 |

METHODS AND APPARATUSES FOR COMMUNICATING IN TELEVISION WHITE SPACE (TVWS) BASED ON TVWS ENABLEMENT SIGNAL

CROSS REFERENCE TO RELATED APPLICATIONS

The present Application for Patent is related by subject matter to U.S. patent application, entitled, "METHODS AND APPARATUSES FOR LOW-RATE TELEVISION WHITE SPACE (TVWS) ENABLEMENT", filed Jan. 12, 2012 and assigned to the assignee hereof and hereby expressly incorporated by reference herein.

CLAIM OF PRIORITY UNDER 35 U.S.C. §119

The present Application for Patent claims benefit of U.S. Provisional Patent Application Ser. No. 61/433,046, entitled, "Low-rate Television White Space (TVWS) enabler", filed Jan. 14, 2011 and assigned to the assignee hereof and hereby expressly incorporated by reference herein.

BACKGROUND

Field

Certain aspects of the present disclosure generally relate to wireless communications and, more particularly, to methods and apparatuses for supporting television white space (TVWS) communication.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements demanded for wireless communications systems, different schemes are being developed. One of the schemes, for example, entails expanding Wi-Fi technology to utilize the unused frequency spectrum in the television (TV) band (i.e., the TV white space). The Institute of Electrical and Electronics Engineers (IEEE) 802.11af task group has been formed to define an amendment to the IEEE 802.11 standard for operating in the TV white space (TVWS). The IEEE 802.11 standard denotes a Wireless Local Area Network (WLAN) air interface standard developed by the IEEE 802.11 working group for short-range communications (e.g., tens of meters to a few hundred meters). By using the TVWS with frequencies below 1 GHz, IEEE 802.11af may offer greater propagation distances to be achieved, in addition to the increased bandwidth offered by the unused frequencies in the TV spectrum.

The Federal Communications Commission (FCC) had developed regulations for unlicensed operation in unused TV channels, referred to as TV white space (TVWS). The TV white space devices (WSDs), also referred to by the FCC as TV band devices (TVBDs), may need to meet a number of requirements for operation in the TVWS so as to avoid causing harmful interference to the licensed services in the TV bands (e.g., broadcast TV, wireless microphones, etc.).

There are several classes of devices defined by the FCC: fixed and personal/portable devices (referred to as portable devices in this disclosure). There are two classes of portable devices: Mode I and Mode II devices.

The portable Mode II devices may need to have geo-location capability with an accuracy of 50 meters and may need to have Internet access so as to be able to check with a database to find out which channels in its location are white space and available for use. The Mode I devices may not need to have geo-location capability or Internet access, but they can only be permitted to transmit in TV channels which are indicated as available from a Fixed or Mode II device. In addition, the Mode I device after receiving initial enablement from the Fixed or Mode II device may need to receive a "contact verification signal" (CVS) from the Fixed or Mode II device at least every 60 seconds in order to continue the TVWS communication, or the Mode I device may need to cease transmission.

The FCC specifies limits on both the total transmit power, and on the power spectral density (PSD) of the TV white space devices. The maximum transmit power of a portable device can be 20 dBm, and this limit can be lowered to 16 dBm when the portable device is operating on a channel adjacent to a broadcast TV signal. In addition to the power limit, there may be also a PSD limit specified by the FCC, which can be controlled by limiting the maximum power in any 100 kHz band. For portable devices, the limit can be 2.2 dBm in 100 kHz, which can be lowered to −1.8 dBm when operating in a channel adjacent to a TV broadcast signal. The PSD limit can prevent high power narrowband signals.

SUMMARY

Certain aspects of the present disclosure provide a method for wireless communications. The method generally includes determining, at an apparatus, a geographical location of the apparatus, obtaining a list of channels of a plurality of television white space (TVWS) channels that support TVWS communication, wherein the channels from the list are available for use at the geographical location, generating a signal having a data rate capable of reaching a plurality of apparatuses, wherein the signal advertises to the apparatuses an enablement for the TVWS communication, and transmitting the signal to the apparatuses using a first channel from the list.

Certain aspects of the present disclosure provide an apparatus for wireless communications. The apparatus generally includes a first circuit configured to determine a geographical location of the apparatus, a second circuit configured to obtain a list of channels of a plurality of television white space (TVWS) channels that support TVWS communication, wherein the channels from the list are available for use at the geographical location, a third circuit configured to generate a signal having a data rate capable of reaching a plurality of apparatuses, wherein the signal advertises to the apparatuses an enablement for the TVWS communication, and a transceiver configured to transmit the signal to the apparatuses using a first channel from the list.

Certain aspects of the present disclosure provide an apparatus for wireless communications. The apparatus generally includes means for determining a geographical location of the apparatus, means for obtaining a list of channels of a plurality of television white space (TVWS) channels that support TVWS communication, wherein the channels from the list are available for use at the geographical location, means for generating a signal having a data rate capable of reaching a plurality of apparatuses, wherein the signal advertises to the apparatuses an enablement for the TVWS communication, and means for transmitting the signal to the apparatuses using a first channel from the list.

Certain aspects of the present disclosure provide a computer-program product for wireless communications. The computer-program product includes a computer-readable medium comprising instructions executable to determine, at an apparatus, a geographical location of the apparatus, obtain a list of channels of a plurality of television white space (TVWS) channels that support TVWS communication, wherein the channels from the list are available for use at the geographical location, generate a signal having a data rate capable of reaching a plurality of apparatuses, wherein the signal advertises to the apparatuses an enablement for the TVWS communication, and transmit the signal to the apparatuses using a first channel from the list.

Certain aspects of the present disclosure provide an access point. The access point generally includes at least one antenna, a first circuit configured to determine a geographical location of the access point, a second circuit configured to obtain a list of channels of a plurality of television white space (TVWS) channels that support TVWS communication, wherein the channels from the list are available for use at the geographical location, a third circuit configured to generate a signal having a data rate capable of reaching a plurality of wireless nodes, wherein the signal advertises to the wireless nodes an enablement for the TVWS communication, and a transceiver configured to transmit, via the at least one antenna, the signal to the wireless nodes using a first channel from the list.

Certain aspects of the present disclosure provide a method for wireless communications. The method generally includes searching, at an apparatus, a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, detecting, based on the search, the signal and the first channel, and transmitting, to the other apparatus upon the detection, a request for the enablement using the first channel.

Certain aspects of the present disclosure provide an apparatus for wireless communications. The apparatus generally includes a first circuit configured to search a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, a second circuit configured to detect, based on the search, the signal and the first channel, and a transceiver configured to transmit, to the other apparatus upon the detection, a request for the enablement using the first channel.

Certain aspects of the present disclosure provide an apparatus for wireless communications. The apparatus generally includes means for searching a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, means for detecting, based on the search, the signal and the first channel, and means for transmitting, to the other apparatus upon the detection, a request for the enablement using the first channel.

Certain aspects of the present disclosure provide a computer-program product for wireless communications. The computer-program product includes a computer-readable medium comprising instructions executable to search, at an apparatus, a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, detect, based on the search, the signal and the first channel, and transmit, to the other apparatus upon the detection, a request for the enablement using the first channel.

Certain aspects of the present disclosure provide an access point. The access point generally includes at least one antenna, a first circuit configured to search a plurality of television white space (TVWS) channels supporting TVWS communication for a signal transmitted from another access point on a first channel of the TVWS channels, wherein the signal is capable of reaching a plurality of wireless nodes for advertising an enablement for the TVWS communication, a second circuit configured to detect, based on the search, the signal and the first channel, and a transceiver configured to transmit, to the other access point upon the detection via the at least one antenna, a request for the enablement using the first channel.

Certain aspects of the present disclosure provide a method for wireless communications. The method generally includes searching, at an apparatus, a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, transmitting, to the other apparatus using the first channel upon detecting the signal and the first channel, a request for the enablement, receiving, from the other apparatus in response to the request, a list of channels of the plurality of TVWS channels being in use by a subset of the apparatuses, and searching, on channels from the list, for a communicating apparatus of the subset.

Certain aspects of the present disclosure provide an apparatus for wireless communications. The apparatus generally includes a first circuit configured to search a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, a transceiver configured to transmit, to the other apparatus using the first channel upon detecting the signal and the first channel, a request for the enablement, wherein the transceiver is also configured to receive, from the other apparatus in response to the request, a list of channels of the plurality of TVWS channels being in use by a subset of the apparatuses, and wherein the first circuit is also configured to search, on channels from the list, for a communicating apparatus of the subset.

Certain aspects of the present disclosure provide an apparatus for wireless communications. The apparatus generally includes means for searching a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, means for transmitting, to the other apparatus using the first channel upon detecting the signal and the first channel, a request for the enablement, means for receiving, from the other apparatus in response to the request, a list of channels of the plurality of TVWS channels being in use by a subset of the apparatuses; and means for searching, on channels from the list, for a communicating apparatus of the subset.

Certain aspects of the present disclosure provide a computer-program product for wireless communications. The computer-program product includes a computer-readable medium comprising instructions executable to search, at an apparatus, a plurality of television white space (TVWS) channels supporting TVWS communication for a signal transmitted from another apparatus on a first channel of the TVWS channels, wherein the signal is capable of reaching a plurality of apparatuses for advertising an enablement for the TVWS communication, transmit, to the other apparatus using the first channel upon detecting the signal and the first channel, a request for the enablement, receive, from the other apparatus in response to the request, a list of channels of the plurality of TVWS channels being in use by a subset of the apparatuses, and search, on channels from the list, for a communicating apparatus of the subset.

Certain aspects of the present disclosure provide an access terminal. The access terminal generally includes at least one antenna, a first circuit configured to search a plurality of television white space (TVWS) channels supporting TVWS communication for a signal transmitted from an access point on a first channel of the TVWS channels, wherein the signal is capable of reaching a plurality of wireless nodes for advertising an enablement for the TVWS communication, a transceiver configured to transmit, via the at least one antenna to the access point using the first channel upon detecting the signal and the first channel, a request for the enablement, wherein the transceiver is also configured to receive, via the at least one antenna from the access point in response to the request, a list of channels of the plurality of TVWS channels being in use by a subset of the wireless nodes, and wherein the first circuit is also configured to search, on channels from the list, for another access point of the subset

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
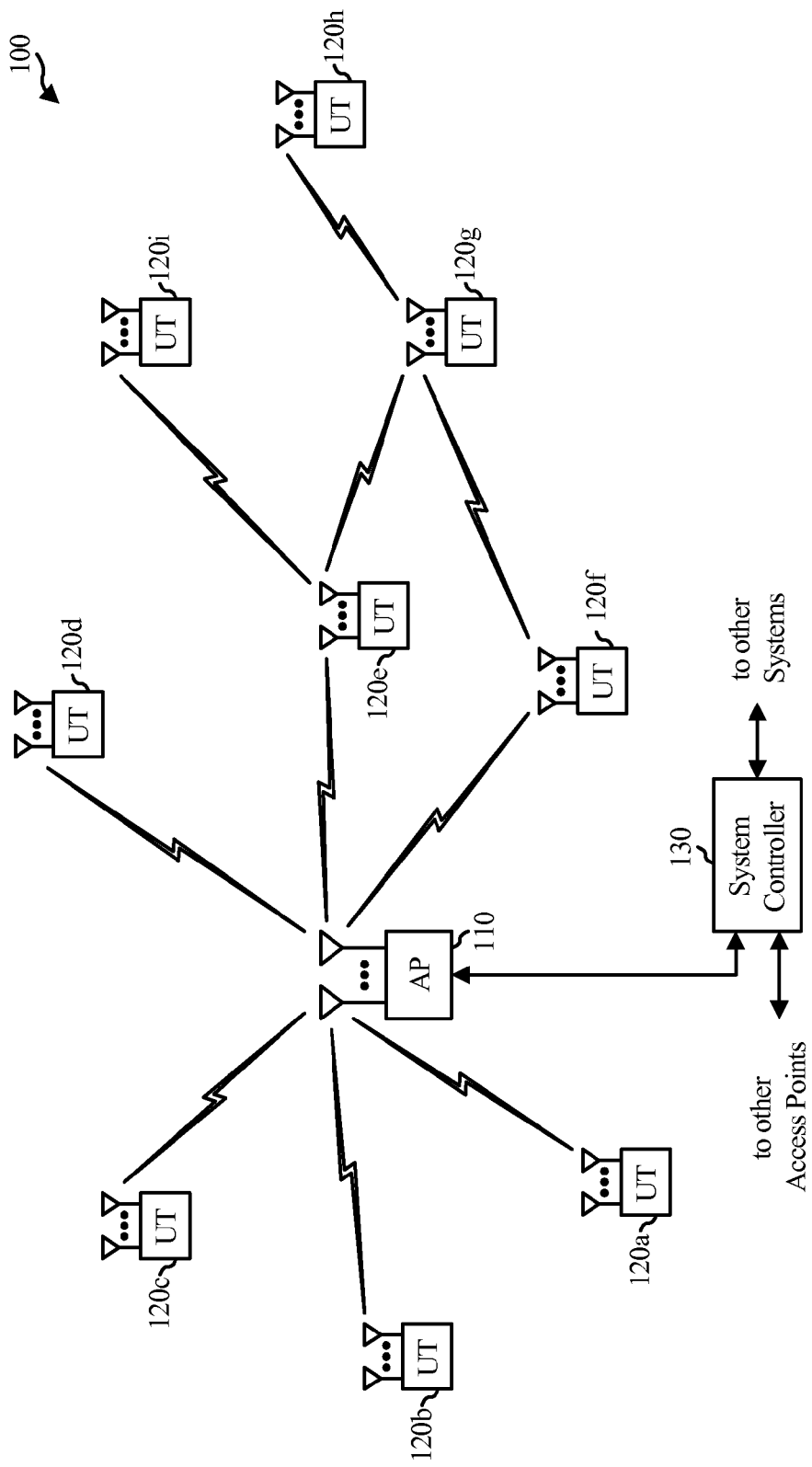
FIG. 1 illustrates a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are created in the frequency domain with OFDM and in the time domain with SC-FDMA.

The teachings herein may be incorporated into (e.g., implemented within or performed by) a variety of wired or wireless apparatuses (e.g., nodes). In some aspects, a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations, an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
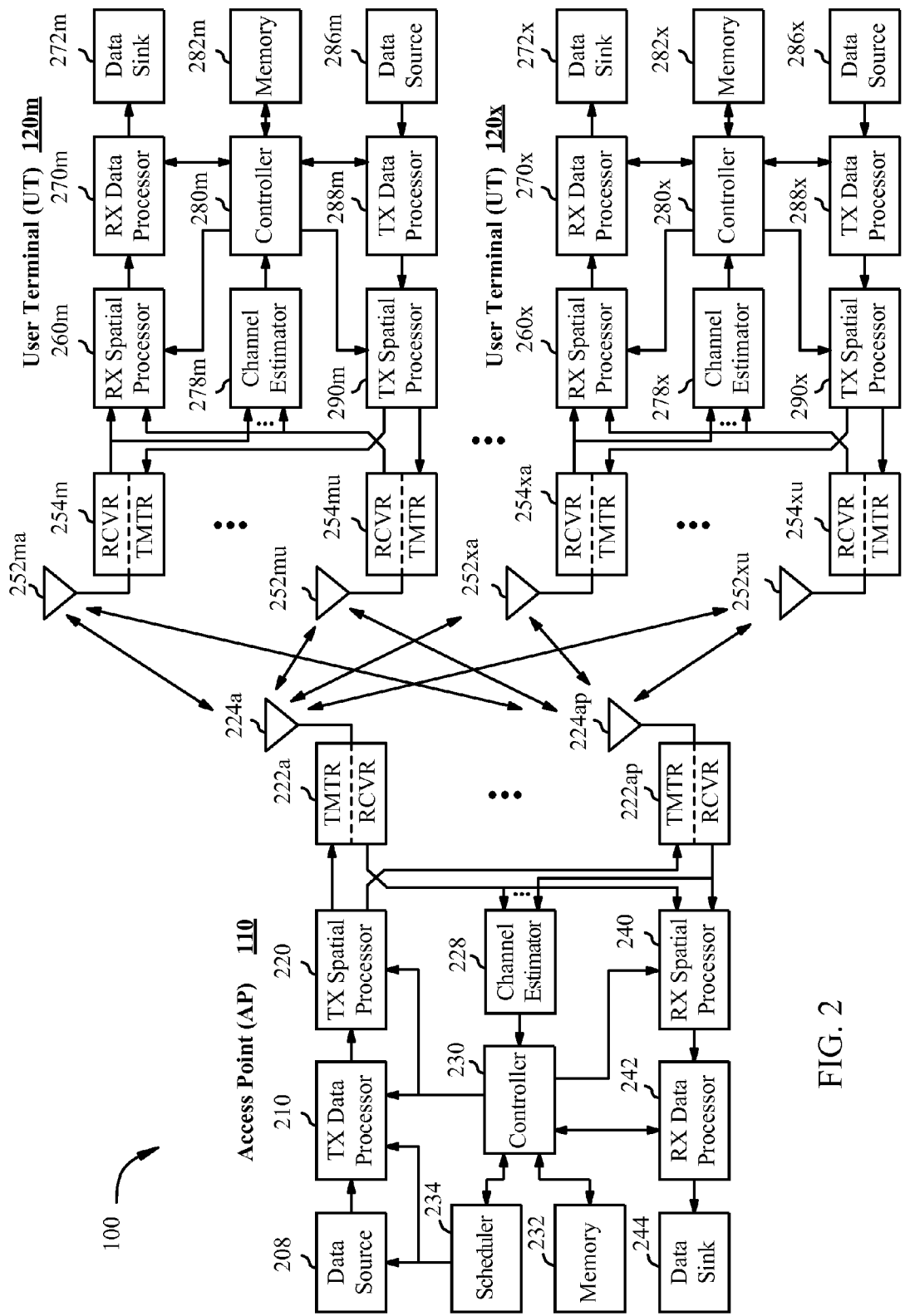
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{ut,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
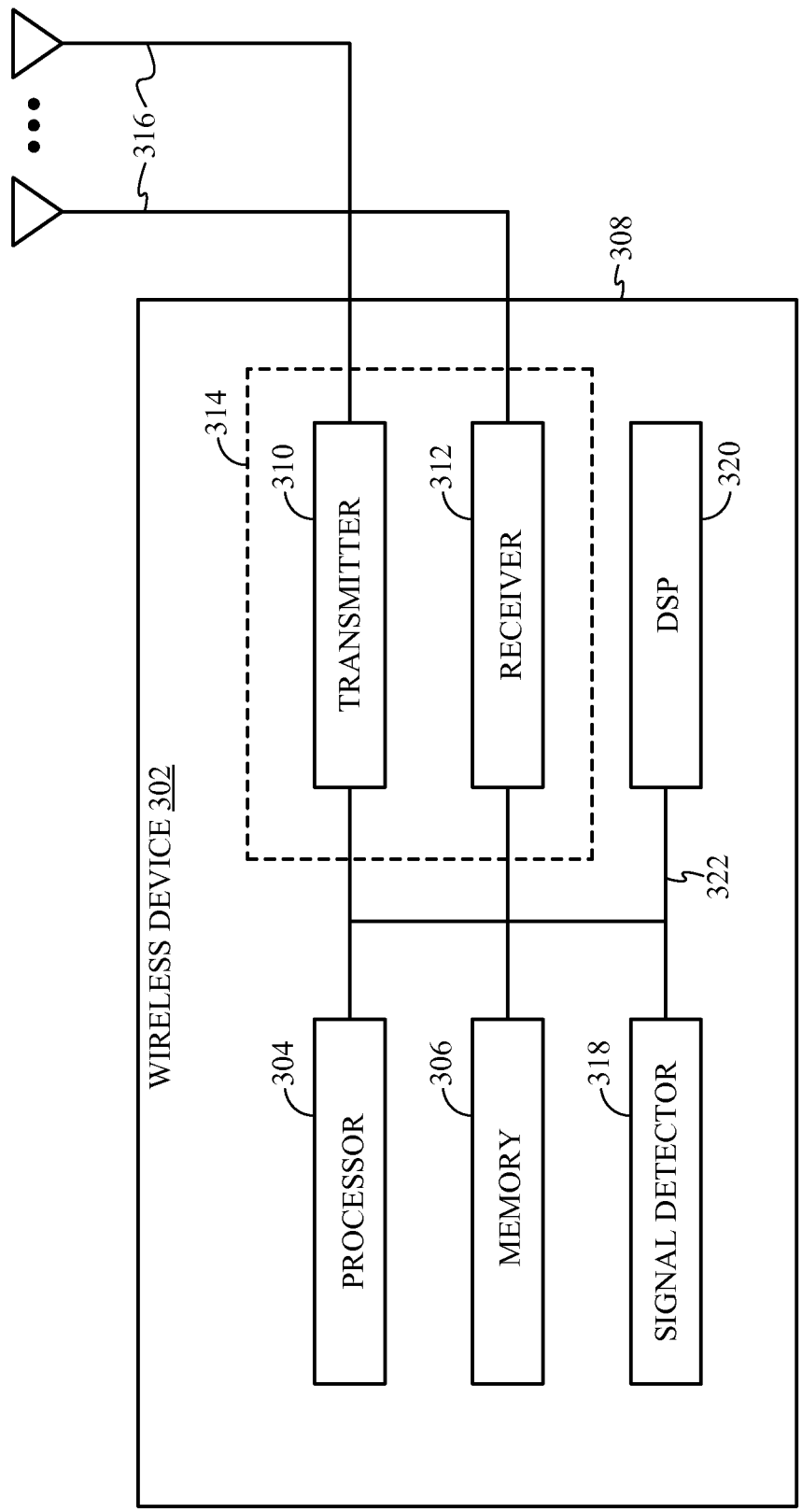
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and another wireless node (e.g., another wireless node in a remote location). The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may detect and quantify the level of signals received by the transceiver 314. The signal detector 318 may quantify detection of such signals using total energy, energy per subcarrier per symbol, power spectral density and/or other quantification metrics. The wireless device 302 may also include a digital signal processor (DSP) 320 for use in processing signals.

The various components of the wireless device 302 may be coupled by a bus system 322, which may include a power bus, a control signal bus, and a status signal bus in addition to a data bus.

Certain aspects of the present disclosure can be applied to Wi-Fi technology. Other wireless technologies can also have similar issues in the television white space (TVWS).

In order to provide good coverage within a building, one or more access points (APs), such as the AP 110 from FIGS. 1-2 and/or the wireless device 302 from FIG. 3, may need to be installed throughout the building. To obtain good coverage of the building, these APs may need to be placed towards the middle of the building and not just on the edge of the building, near a window. However, this may be a problem since these APs may typically need to be Mode II devices with geo-location capability and access to the TVWS database. These APs may then enable the portable Mode I devices (e.g., laptop computer, cell phone, etc.) to transmit in the TVWS. According to certain aspects of the present disclosure, the portable Mode I devices may be the user terminals 120 illustrated in FIGS. 1-2 and/or the wireless device 302 from FIG. 3.

If the Mode II access points are installed toward the middle of the building, it is possible that they will not be able to obtain Global Positioning System (GPS) lock (i.e., to establish GPS connection) with 50 meters accuracy. If these Mode II APs cannot maintain GPS lock, then the APs cannot transmit and cannot enable the Mode I clients (e.g., the user terminals 120 from FIGS. 1-2) to transmit. A Mode II device may need to check its location every 60 seconds. If geo-location knowledge is lost, then the network can no longer utilize the TVWS. Furthermore, the loss of GPS lock may bring down the whole network. In some indoor environments, the regular GPS may not be sensitive enough to detect enough satellites to calculate the location. Building a high-sensitivity GPS is a possibility, but that may need assisted GPS using a cellular receiver and massive parallel correlators (e.g., utilizing up to 16,000 correlators).

On the other hand, it is very inefficient to place all the Mode II APs near the edge of the building, where GPS coverage would be possible. This approach may provide very poor coverage and may not provide acceptable network performance. In a home or in an apartment, the Mode II AP may be unusable. In addition, in some applications, the Mode II device may need to be in a certain room if this device performs a specific function, and hence it may not be possible to place the Mode II device near a window.

Operation in Television White Space (TVWS)

A low-rate TVWS enabler is a novel device whose operation is first described in the present disclosure. This device is capable of fixing the problem of AP placement and the problem of loosing GPS connection for a floor or even an entire building. According to certain aspects of the present disclosure, the TVWS enabler may be configured such as the access point 110 from FIGS. 1-2 and/or the wireless device 302 from FIG. 3. In an aspect, the low-rate TVWS enabler may comprise the following features: a GPS receiver (e.g., the receiver 222 from FIG. 2 may operate as a GPS receiver), Internet access, and a low-rate transceiver using either direct sequence spread spectrum (DSSS) or OFDM (e.g., the transceiver TMTR/RCVR 222 from FIG. 2 may operate as a low-rate DSSS transceiver or as a low-rate OFDM transceiver).

According to certain aspects of the present disclosure, the low-rate TVWS enabler device may be placed inside a building near a window where good GPS connection can be maintained, e.g., with 50-meter accuracy. The device may also have Internet access so it can operate as a Mode II TV white space device. As aforementioned, this device may comprise the low data rate DSSS transceiver, wherein the data rate of DSSS signal may be much lower than what is typically used by a Wi-Fi access point. For example, the data rate may be approximately 10 Kbits per second or 100 Kbits per second. However, the signal cannot be a narrowband signal because if that were the case the transmit power would be severely limited based on the FCC regulations on power spectral density limits. Therefore, the low data rate signal may be spread by a higher rate chip sequence to spread the power of the signal out over the majority of the 6 MHz TV channel. By utilizing the DSSS, the transmit power may be kept high near the power limit, but by keeping the data rate low the coverage can be made large. As an alternative to employing a DSSS physical (PHY) layer, the low-rate TVWS enabler may utilize an OFDM PHY that uses repetition codes to lower the data rate of OFDM signal while still maintaining the signal bandwidth. Different medium access control (MAC) layer technologies can be utilized with the low-rate PHY, such as the IEEE 802.11 MAC.

By operating at a low data rate, the TVWS enabler may communicate with Mode I devices over the entire floor of the building or the entire building. With the low-rate TVWS enabler providing transmission enablement over the floor or the entire building, TVWS Wi-Fi access points may now operate as Mode I TVWS devices and they may not need geo-location capability. These Mode I APs may now be placed anywhere inside the buildings where they can receive the enablement signal from the low-rate TVWS enabler. In addition, the Wi-Fi client devices (user stations (STAs)) may also receive their enablement signal from the low-rate TVWS enabler, and not from the access points that provide wireless access to the STAs.

In an aspect of the present disclosure, the low-rate TVWS enabler may provide initial enablement for all Mode I devices (APs and STAs), as well as it may transmit a contact verification signal (CVS) on a regular basis to keep the Mode I devices enabled to continue the TVWS operation.

Figure 4:
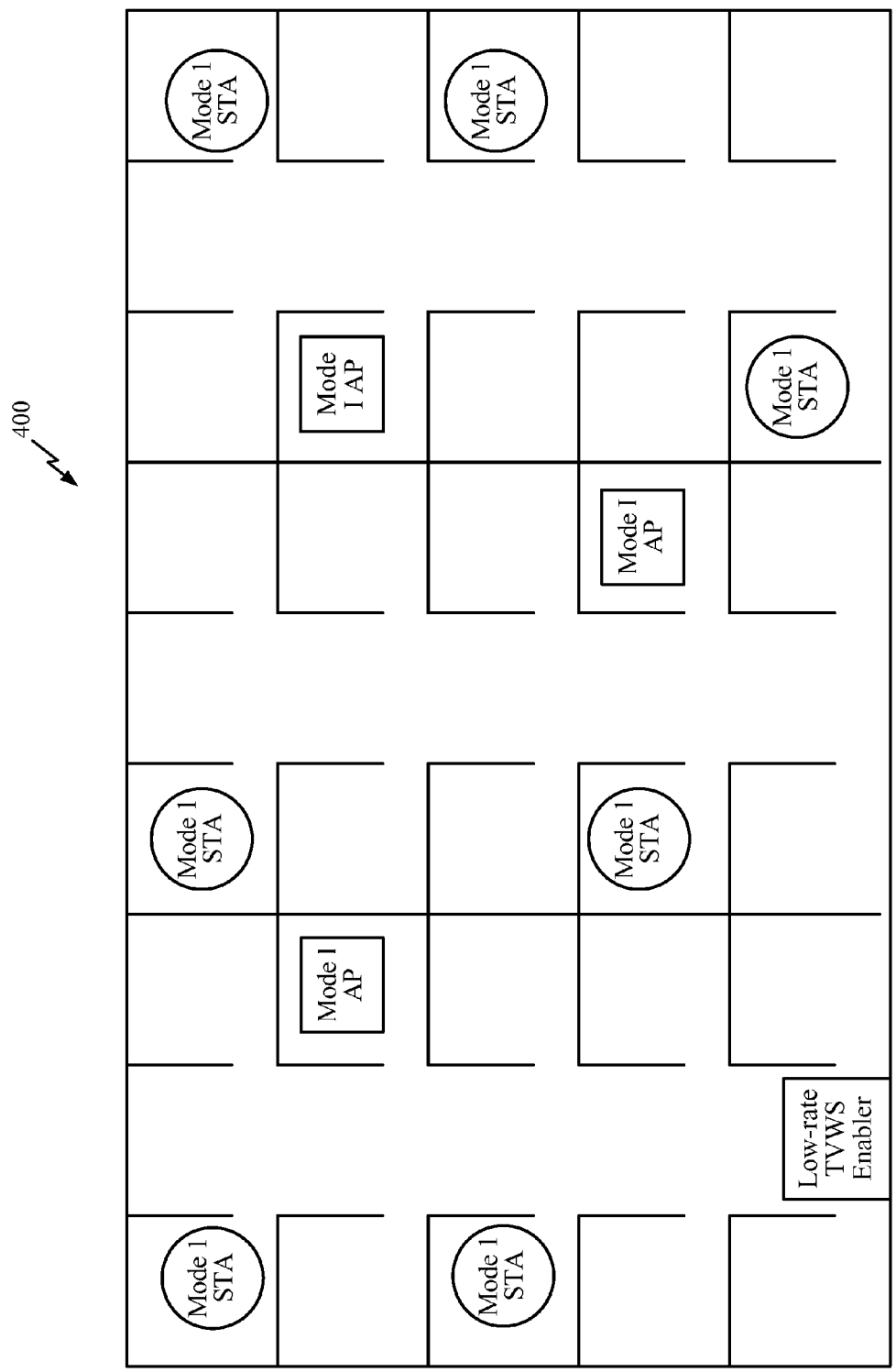
FIG. 4 illustrates an example deployment of low-rate television white space (TVWS) enabler, Mode I access points and Mode I user stations in accordance with certain aspects of the present disclosure.

FIG. 4 illustrates an example deployment 400 of a low-rate TVWS enabler, Mode I access points and Mode I user STAs in accordance with certain aspects of the present disclosure. FIG. 4 illustrates an office building, but the same approach can be applied to any indoor location (e.g., mall, apartment complex, house, etc). For example, in an apartment complex, one low-rate TVWS enabler may enable multiple apartments.

Low-Rate TVWS Enabler

At power up, the low-rate TVWS enabler may establish GPS connection and may determine its geographical location based on the GPS information. Then, it may contact a TVWS database and obtain a list of available TV channels at this location. After that, the TVWS enabler may select one of the available TVWS channel (e.g., Channel A), and may broadcast a signal advertising that it can provide enablement (e.g., an enablement beacon). In an aspect of the present disclosure, the enablement beacon may be an IEEE 802.11 beacon with an information element indicating that the TVWS enabler provides TVWS enablement. The TVWS enabler may transmit the enablement advertisement signal using the low-rate PHY so that the transmitted signal (i.e., the low-rate signal) may be heard over a large region (e.g., the entire building). After transmitting the enablement advertisement signal, the TVWS enabler may wait to be contacted by either a Mode I AP or a Mode I STA.

If the low-rate enabler operates on a dedicated channel so that none of the Mode I APs are operating on that channel, then the low-rate enabler may transmit the enablement beacon frequently so that this beacon can be detected quickly by a new AP or STA. However, if there are few TVWS channels, then the low-rate enabler may transmit the enablement beacon less frequently so as to not cause too much interference to the APs/STAs operating on the same channel. If the low-rate enabler operates on a shared channel, then it may transmit to the APs on that channel a schedule of the enablement beacon so that all the APs/STAs can be silent (i.e., not transmitting) during the enablement beacon so that new APs/STAs can hear the enablement beacon.

In an aspect of the present disclosure, a Mode I AP may be configured to transmit a "Clear-to-send (CTS)-to-Self" message according to the schedule of enablement beacon. Then, each of the STAs associated with the AP may be able to receive, on the shared channel, the "CTS-to-Self" message, and refrain from the TVWS communication based on reception of the "CTS-to-Self" message.

Figures 5, 6:
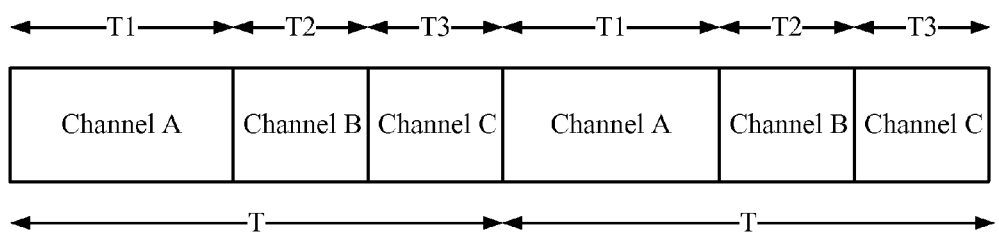
FIG. 5 illustrates an example list of occupied TVWS channels in accordance with certain aspects of the present disclosure.
FIG. 6 illustrates example frequencies occupied by a low-rate TVWS enabler in accordance with certain aspects of the present disclosure.

Once contacted by a Mode I AP/STA, the TVWS enabler may receive the FCC Identifier (ID) of the Mode I AP/STA, send that FCC ID to the TVWS database for verification, and, after receiving verification, it may provide the list of available TV channels to the Mode I AP/STA. After transmitting the list of available channels to the Mode I AP/STA, the low-rate TVWS enabler may transmit to the Mode I AP/STA the "Occupied Channel List". This list may comprise a list of channels that have been previously selected for use by Mode I APs enabled by the low-rate enabler and the channel originally selected for use by the low-rate enabler (e.g., Channel A). The Occupied Channel List may comprise both a center frequency and a channel bandwidth of a channel, as illustrated in FIG. 5 for three different channels A, B and C. If this is the first AP enabled by the low-rate enabler, then the Occupied Channel List may only comprise the channel originally selected by the low-rate enabler (e.g., Channel A).

If the device enabled is a Mode I AP, then the AP may select a channel of operation (e.g., Channel B). After making that selection, the AP may transmit back to the low-rate enabler that it has selected Channel B for operation. The low-rate enabler may then add that channel to the Occupied Channel List, i.e., the Occupied Channel List may now comprise Channels A and B.

After the AP has selected its channel of operation, the low-rate enabler may transmit a message to the AP with information about a transmission period of the CVS on that channel. The AP may subsequently utilize this information to wake up STAs that are in a sleep mode so they may be able to receive the CVS message.

If the device being enabled is a Mode I STA (client), then the STA may use the Occupied Channel List to search for an available AP for TVWS communication. Having this occupied channel list may substantially reduce a time required for the STA to discover an AP since there may be many possible channel center frequencies and bandwidths. Without the Occupied Channel List, searching over all those channel center frequencies and bandwidths can be time consuming.

In an aspect of the present disclosure, the low-rate enabler may check its GPS location every 60 seconds as required by the FCC. In an aspect, the low-rate enabler may check the TVWS database every 24 hours as required by the FCC.

Prior to enabling any AP for TVWS communication, the low-rate enabler may only transmit on its originally selected channel (e.g., Channel A). Once the low-rate enabler has enabled the AP, which may be operating on a different channel (e.g., Channel B), the low-rate enabler may need to transmit a CVS periodically as specified by the FCC. In an aspect, the low-rate enabler may transmit a message to the AP with a schedule for the CVS signal on that channel (Channel B). In an aspect, the AP may schedule a quiet time for itself and its associated STAs during the scheduled CVS. Then, the APs and STAs may be able to receive the CVS during the scheduled time. In an aspect, the low-rate enabler may tune to the channel occupied by the enabled AP (Channel B), and transmit the CVS on that channel.

In an aspect, the AP may schedule a quiet time for its associated STAs during the scheduled CVS by transmitting a "CTS-to-Self" message according to the schedule for the CVS signal. Then, each of the STAs associated with the AP may be able to receive, with the periodicity of transmitting the CVS from the low-rate TVWS enabler, the "CTS-to-Self message". That STA may refrain, based on the received "CTS-to-Self" message, from the TVWS communication on the Channel B with the AP during reception of the CVS.

If multiple APs have been enabled and operate on separate channels, then the low-rate enabler may periodically tune to each of the channels occupied by an AP and transmit a CVS message. FIG. 6 illustrates an example of switching between channels (e.g., performed by the low-rate enabler), in the case when combination of the low-rate enabler and all enabled APs can utilize a set of three channels (Channels A, B and C). As illustrates in FIG. 6, the low-rate enabler may cycle through the set of channels with a period of time T. In an aspect, this cycle period may be a fraction of one minute so that the low-rate enabler may tune to each channel multiple times in one minute.

For example, as illustrated in FIG. 6, the low-rate enabler may occupy Channel A for a period of time T1 during which it may transmit the enablement advertisement making it possible for new APs and STAs to discover the low-rate enabler and to obtain initial enablement. Then, low-rate enabler may operate on Channel B for a period of time T2 during which it may transmit the CVS signal so that all the APs and STAs operating on that channel may be able to receive the CVS signal. After that, the low-rate enabler may operate on Channel C for a period of time T3 during which it may transmit the CVS signal so that the APs and STAs operating on Channel C may be able to receive the CVS signal. In an aspect, the time periods T2 and T3 may be much shorter than the time period T1 since the time required to transmit the CVS may not be very long. In this case, the low-rate enabler may operate much of the time on Channel A where new APs and STAs can discover it.

Mode I Access Point

At power up, a Mode I AP may search each of a plurality of TV channels for a low-rate enabler. When the low-rate enabler is detected, then the Mode I AP may send to the low-rate enabler a request for enablement on a channel used by the low-rate enabler. Along with the enablement request, the Mode I AP may include its FCC ID. After receiving the list of available TV channels and Occupied Channel List from the low-rate enabler, the Mode I AP may select a channel for use. It is more likely that the AP will choose a channel not currently occupied by other APs so that they do not share the same channel, but the Mode I AP may also choose a channel in the Occupied Channel List if there are limited number of channels to choose from.

After selecting a channel for operation, the Mode I AP may transmit to the low-rate enabler information about which channel it has selected for operation (e.g., a center frequency and a bandwidth of the channel). In an aspect, the Mode I AP may communicate with the low-rate enabler using a low-rate PHY (e.g., a low-rate OFDM PHY or a low-rate DSSS PHY) in both transmit and receive directions. After transmitting the channel information to the low-rate enabler, the Mode I AP may begin normal operation on the selected channel. In an aspect of the present disclosure, the Mode I AP may schedule a quiet time for itself and all its associated STAs during the CVS schedule.

Periodically, the Mode I AP may receive a CVS signal from the low-rate enabler. If it does not receive the CVS for a time period of more than 60 seconds, the AP may switch back to the original channel occupied by the low-rate enabler (e.g., Channel A), and it may request a new TVWS enablement.

In an aspect of the present disclosure, the Mode I AP may transmit, within a beacon, a frequency of a low-rate enabler. In this way, when a new STA arrives and hears the AP beacon, the STA may know on which channel to find the low-rate enabler. This may decrease the time needed by the STA to obtain the initial enablement. In an aspect, the beacon may also comprise a MAC address of the low-rate enabler.

Mode I User Station (STA)

A Mode I STA may begin its operation by searching for a low-rate enabler or a Mode I AP. If the Mode I STA hears a Mode I AP advertising in its beacon a frequency of the low-rate enabler, then the STA may tune to that frequency. Then, once the STA hears an enablement beacon transmitted from the low-rate enabler, the STA may transmit an enablement request on the same channel used by the low-rate enabler, along with its FCC ID. After the STA receives a list of available channels and an Occupied Channel List from the low-rate TVWS enabler, the STA may then search for a Mode I AP on the channels listed in the Occupied Channel List. In an aspect of the present disclosure, the Mode I STA may communicate with the low-rate enabler using a low-rate PHY (e.g., a low-rate OFDM PHY or a low-rate DSSS PHY) in both transmit and receive directions.

Since the STA has already received enablement, it may utilize either active or passive scanning to search for the AP. By using active scanning, the STA may find the AP much faster. After that, the STA may associate with the AP for TVWS communication based on one of many criteria, for example, based on a receive signal strength. Once the association procedure with the Mode I AP is completed, the STA may perform normal operation. In an aspect, the STA may quiet its transmission during the CVS schedule, which may be received from the AP. Periodically, the STA may receive a CVS signal from the low-rate enabler. If it does not receive the CVS for a period of more than 60 seconds, the STA may return to the original channel occupied by the low-rate enabler (e.g., Channel A) and request a new enablement.

Figure 7:
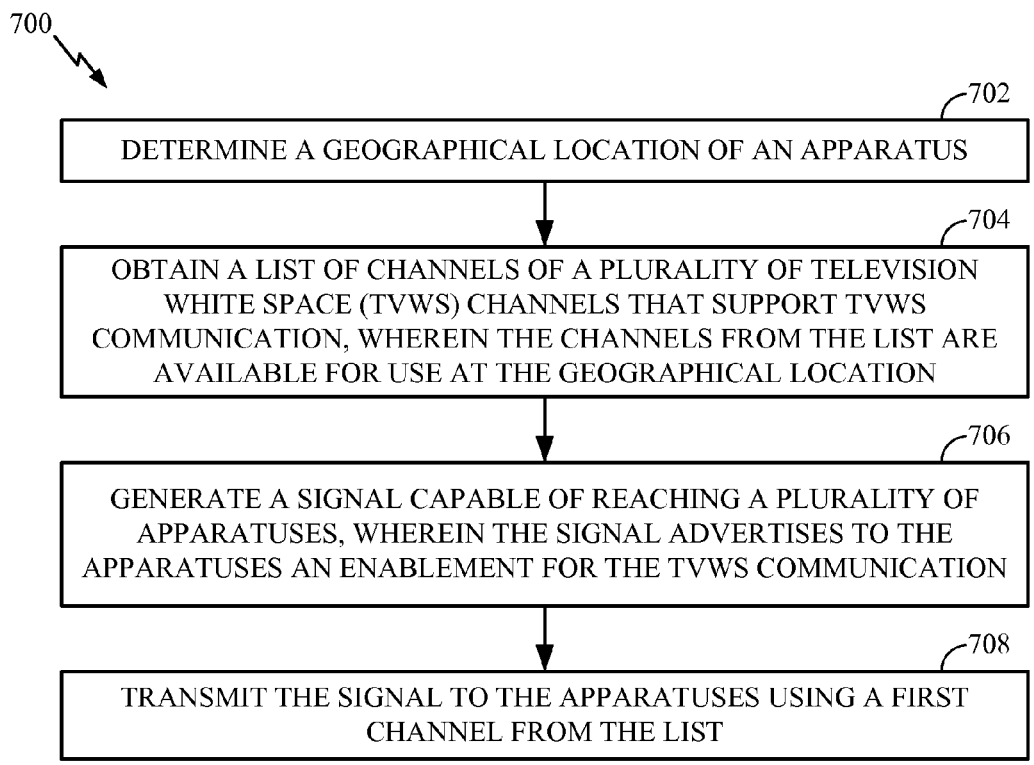
FIG. 7 illustrates example operations that may be performed at a low-rate TVWS enabler in accordance with certain aspects of the present disclosure.

FIG. 7 illustrates example operations 700 that may be performed at a low-rate TVWS enabler (i.e., at a Mode II access point) in accordance with certain aspects of the present disclosure. At 702, the low-rate TVWS enabler may determine its geographical location. At 704, the low-rate TVWS enabler may obtain a list of channels of a plurality of TVWS channels that support TVWS communication, wherein the channels from the list may be available for use at the geographical location. At 706, the low-rate TVWS enabler may generate a signal having a data rate capable of reaching a plurality of apparatuses (e.g., Mode I access points and Mode I stations), wherein the signal may advertise to the apparatuses an enablement for the TVWS communication. At 708, the low-rate TVWS enabler may transmit the data rate signal to the apparatuses using a first channel from the list. In an aspect, at least one of the TVWS enabler or the plurality of apparatuses comprises TVBD operating in the TVWS.

In an aspect of the present disclosure, the low-rate TVWS enabler may receive, from a subset of the apparatuses on the first channel, one or more requests for enabling the TVWS communication at the subset of apparatuses. Further, the low-rate TVWS enabler may receive an ID associated with each apparatus from the subset. Then, the low-rate TVWS enabler may transmit, on the first channel in response to the requests, the list of channels to one or more apparatuses from the subset, wherein each of the one or more apparatuses may be associated with the ID that was verified.

Figure 7A:
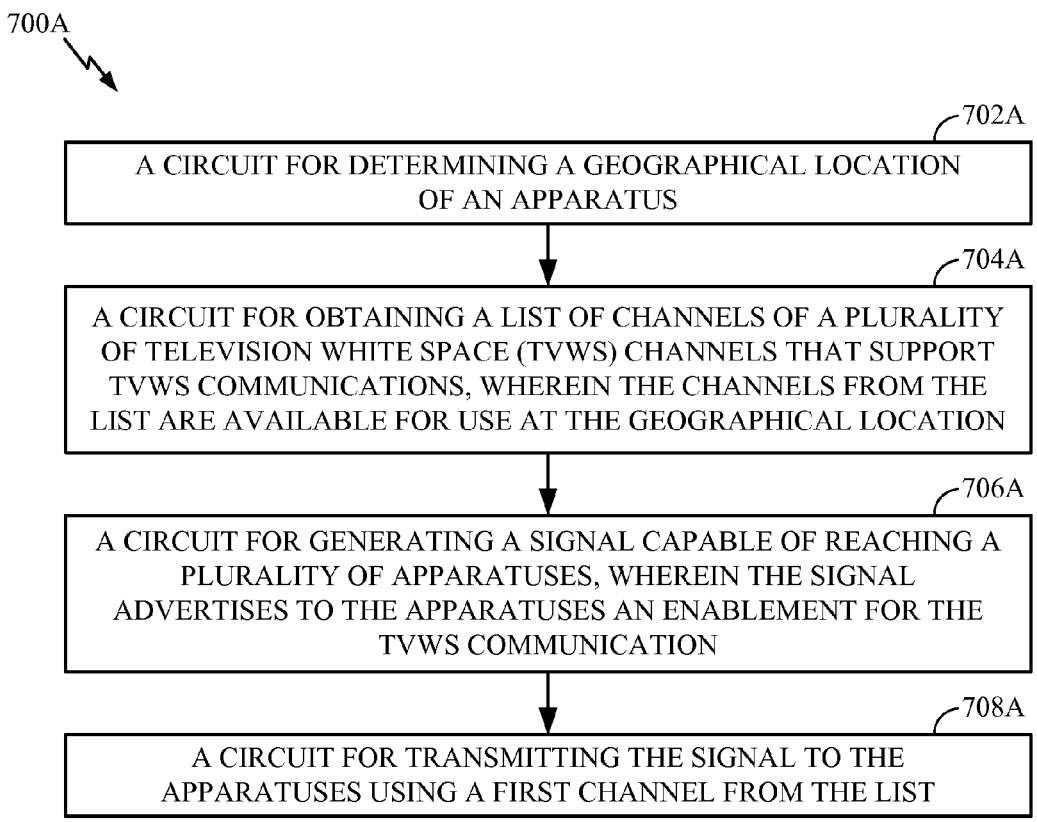
FIG. 7A illustrates example operations that may be performed at a low-rate TVWS enabler using example components in accordance with certain aspects of the present disclosure.

FIG. 7A illustrates example operations 700A that may be performed at a low-rate TVWS enabler (e.g., at the access point 110 from FIG. 2 and/or at the wireless device 302 from FIG. 3) using example components in accordance with certain aspects of the present disclosure. At 702A, a first circuit of the low-rate TVWS enabler (e.g., the controller 230 from FIG. 2 and/or the signal detector 318 from FIG. 3) may be configured to determine its geographical location. At 704A, a second circuit of the low-rate TVWS enabler (e.g., the controller 230 and/or the signal detector 318) may be configured to obtain a list of channels of a plurality of TVWS channels that support TVWS communication, wherein the channels from the list may be available for use at the geographical location. At 706A, a third circuit of the low-rate TVWS enabler (e.g., the TX data processor 210 from FIG. 2 and/or the processor 304 from FIG. 3) may be configured to generate a signal having a data rate capable of reaching a plurality of apparatuses (e.g., Mode I access points and Mode I stations), wherein the signal may advertise to the apparatuses an enablement for the TVWS communication. At 708A, a transceiver of the low-rate TVWS enabler (e.g., the transceiver 222 from FIG. 2 and/or the transceiver 314 from FIG. 3) may be configured to transmit the data rate signal to the apparatuses using a first channel from the list.

Figure 8:
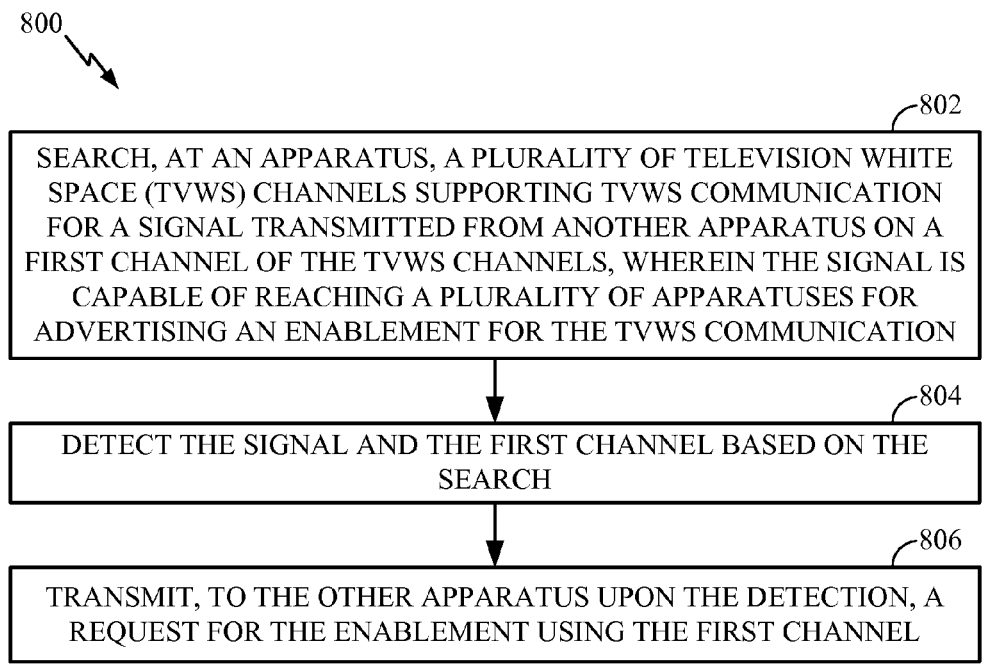
FIG. 8 illustrates other example operations that may be performed at a Mode I access point in accordance with certain aspects of the present disclosure.

FIG. 8 illustrates other example operations 800 that may be performed at an apparatus (e.g., a Mode I access point) in accordance with certain aspects of the present disclosure. At 802, the access point may search a plurality of TVWS channels supporting TVWS communication for a signal transmitted from another apparatus (e.g., from a low-rate TVWS enabler) on a first channel of the TVWS channels, wherein the signal may be capable of reaching a plurality of apparatuses (e.g., Mode I access points and Mode I stations) for advertising an enablement for the TVWS communication. At 804, the access point may detect, based on the search, the signal and the first channel. At 806, the access point may transmit, to the other apparatus upon the detection, a request for the enablement using the first channel. In an aspect, at least one of the apparatus, the other apparatus, or the plurality of apparatuses comprise TVBD operating in the TVWS.

Figure 8A:
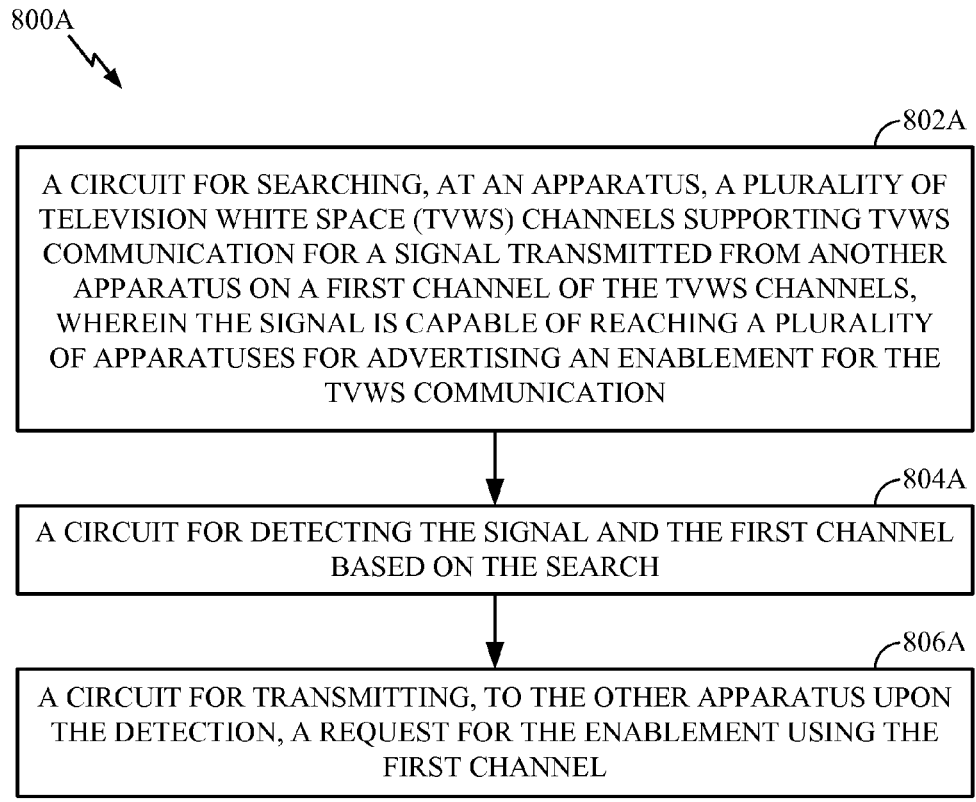
FIG. 8A illustrates example operations that may be performed at a Mode I access point using example components in accordance with certain aspects of the present disclosure.

FIG. 8A illustrates example operations 800A that may be performed at a Mode I access point (e.g., at the access point 110 from FIG. 2 and/or at the wireless device 302 from FIG. 3) using example components in accordance with certain aspects of the present disclosure. At 802A, a first circuit of the access point (e.g., the RCVR unit 222 from FIG. 2 and/or the receiver 312 from FIG. 3) may be configured to search a plurality of TVWS channels supporting TVWS communication for a signal transmitted from another apparatus (e.g., from a low-rate TVWS enabler) on a first channel of the TVWS channels, wherein the signal may be capable of reaching a plurality of apparatuses (e.g., Mode I access points and Mode I stations) for advertising an enablement for the TVWS communication. At 804A, a second circuit of the access point (e.g., the RX data processor 242 from FIG. 2 and/or the signal detector 318 from FIG. 3) may be configured to detect, based on the search, the signal and the first channel. At 806A, a transceiver of the access point (e.g., the transceiver 222 from FIG. 2 and/or the transceiver 314 from FIG. 3) may be configured to transmit, to the other apparatus upon the detection, a request for the enablement using the first channel.

Figure 9:
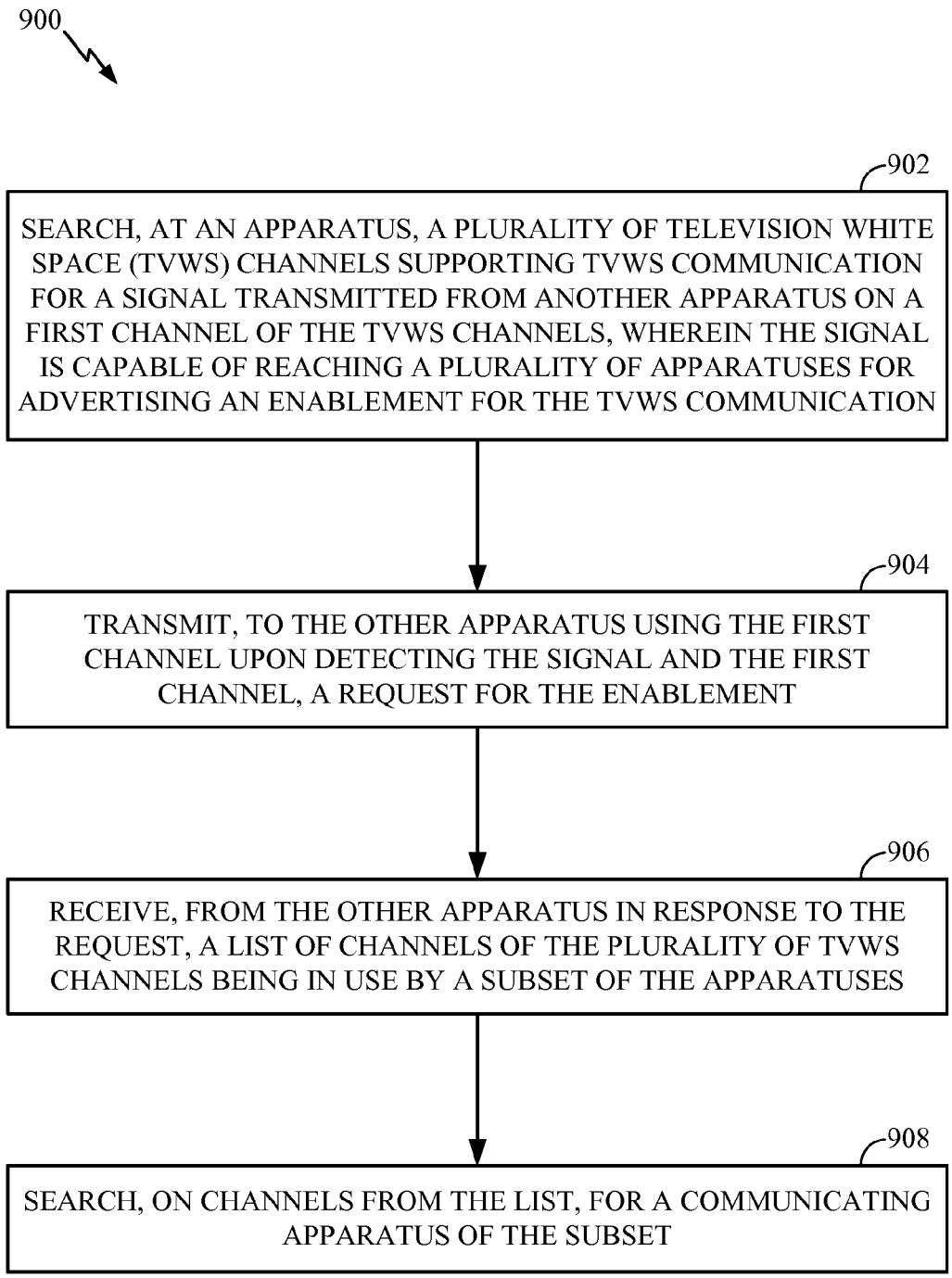
FIG. 9 illustrates example operations that may be performed at a Mode I user station in accordance with certain aspects of the present disclosure.

FIG. 9 illustrates example operations 900 that may be performed at an apparatus (e.g., a Mode I STA) in accordance with certain aspects of the present disclosure. At 902, the STA may search a plurality of TVWS channels supporting TVWS communication for a signal transmitted from another apparatus (e.g., from a low-rate TVWS enabler) on a first channel of the TVWS channels, wherein the signal may be capable of reaching a plurality of apparatuses (e.g., Mode I access points and Mode I STAs) for advertising an enablement for the TVWS communication. At 904, the STA may transmit, to the other apparatus using the first channel upon detecting the signal and the first channel, a request for the enablement. At 906, the STA may receive, from the other apparatus in response to the request, a list of channels of the plurality of TVWS channels being in use by a subset of the apparatuses. At 908, the STA may search, on channels from the list, for a communicating apparatus of the subset. In an aspect, at least one of the apparatus, the other apparatus, or the plurality of apparatuses comprise TVBD operating in the TVWS.

Figure 9A:
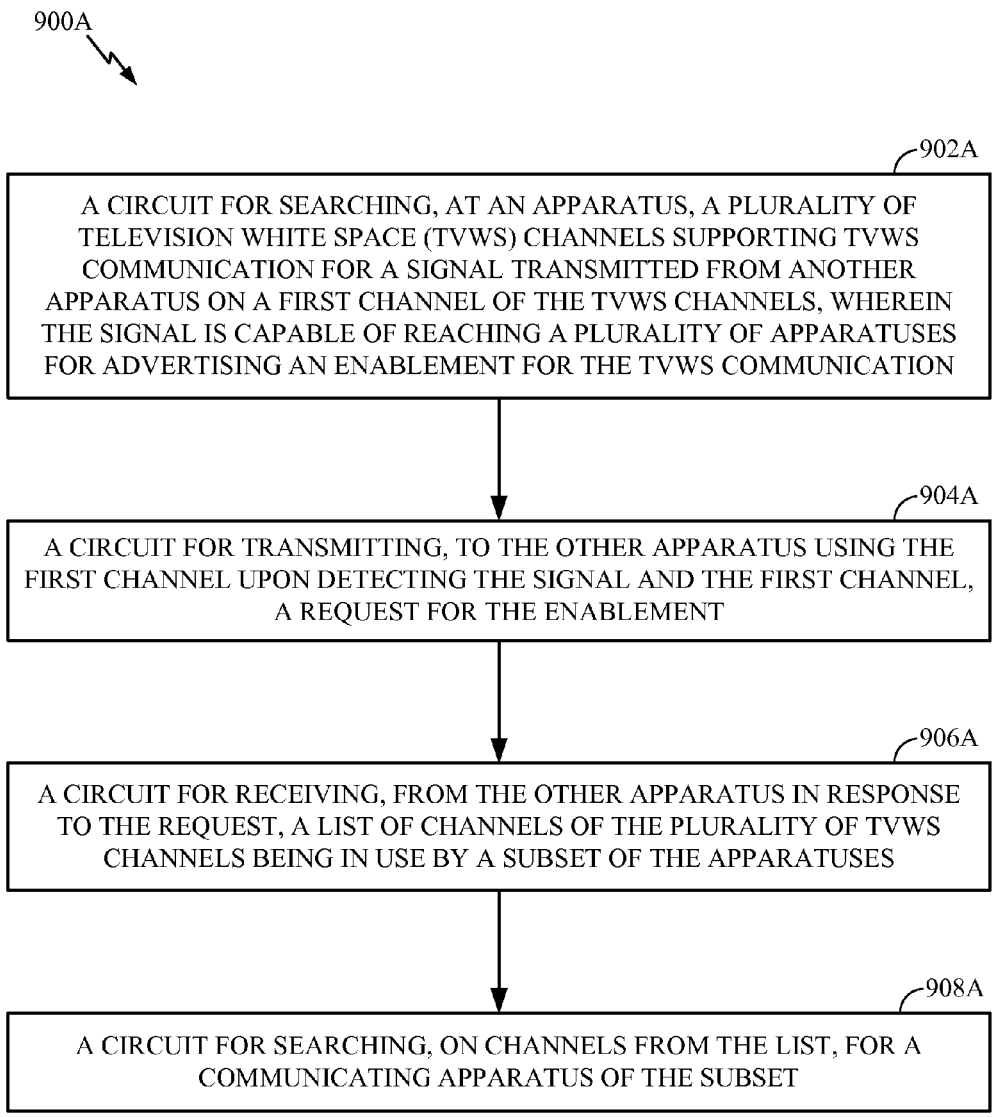
FIG. 9A illustrates example operations that may be performed at a Mode I user station using example components in accordance with certain aspects of the present disclosure.

FIG. 9A illustrates example operations 900A that may be performed at a Mode I user station (STA) (e.g., at the user terminal 120 from FIG. 2 and/or at the wireless device 302 from FIG. 3) using example components in accordance with certain aspects of the present disclosure. At 902A, a first circuit of the STA (e.g., the RCVR unit 254 from FIG. 2 and/or the receiver 312 from FIG. 3) may be configured to search a plurality of TVWS channels supporting TVWS communication for a signal transmitted from another apparatus (e.g., from a low-rate TVWS enabler) on a first channel of the TVWS channels, wherein the signal may be capable of reaching a plurality of apparatuses (e.g., Mode I access points and Mode I STAs) for advertising an enablement for the TVWS communication. At 904A, a transceiver of the STA (e.g., the transceiver 254 from FIG. 2 and/or the transceiver 314 from FIG. 3) may be configured to transmit, to the other apparatus using the first channel upon detecting the signal and the first channel, a request for the enablement. At 906A, the transceiver of the STA may be also configured to receive, from the other apparatus in response to the request, a list of channels of the plurality of TVWS channels being in use by a subset of the apparatuses. At 908A, the first circuit of the STA may be also configured to search, on channels from the list, for a communicating apparatus of the subset.

Scheduling of Contact Verification Signal and Enabling Frame

According to certain aspects of the present disclosure, a low rate PHY of low-rate enabler (LRE) may transmit an Enabling Frame (EF) and a CVS as packets in order to enable dependent STAs and/or APs to discover the LRE. However, since the LRE may not be able to detect some of the transmissions from the enabled devices (since they may be transmitted at a high PHY rate), the LRE may not be able to perform the carrier sense and defer to such transmissions. In an absence of a mechanism for deferral, a probability of the EF colliding with current transmissions may be high. Certain aspects of the present disclosure support a method for avoiding collisions of the EF with other network traffic.

Figure 10:
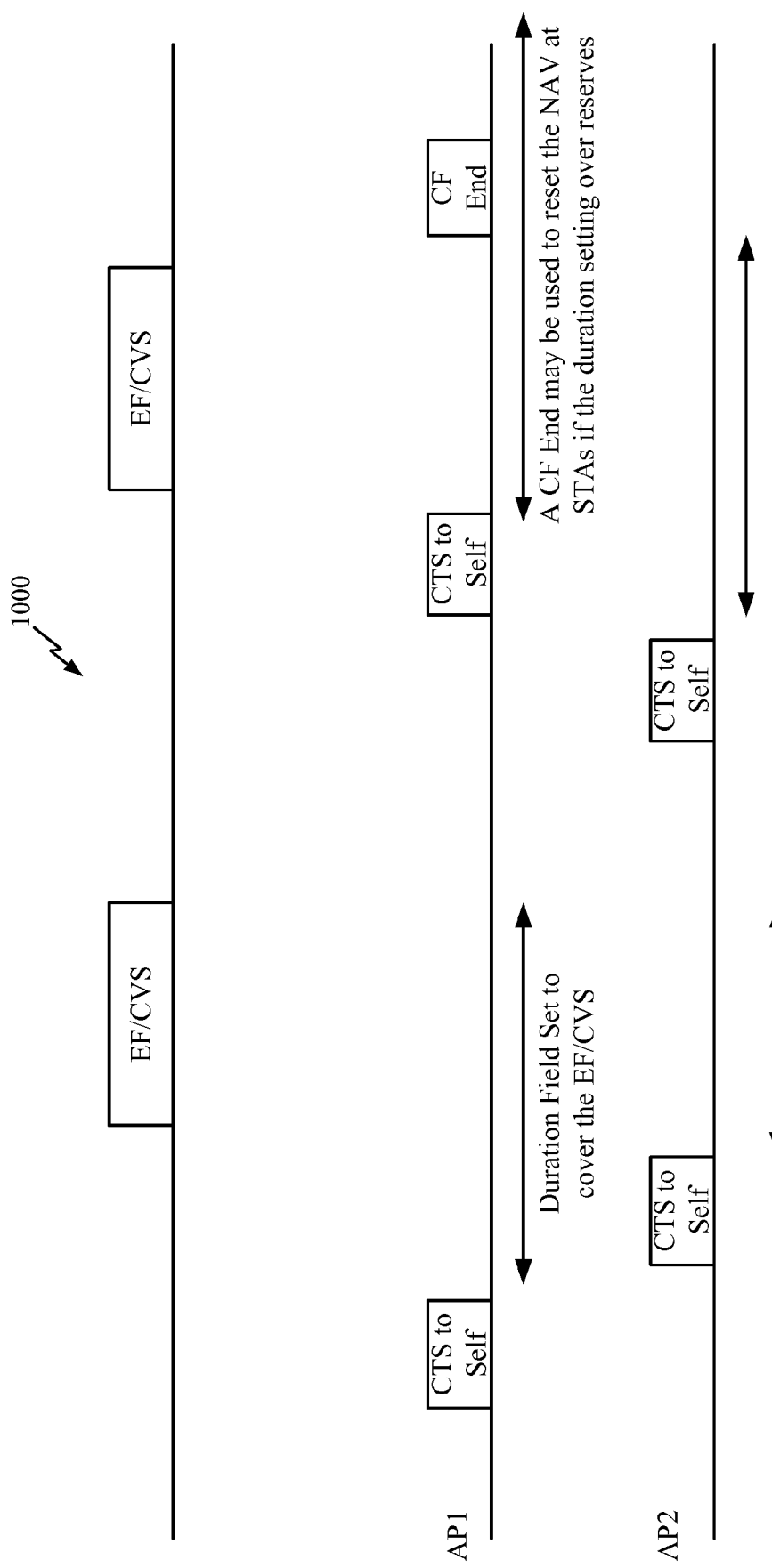
FIG. 10 illustrates an example procedure of access points transmitting Clear-to-send (CTS)-to-Self frames to cover transmission of an enabling frame (EF) or a contact verification signal in accordance with certain aspects of the present disclosure.

FIG. 10 illustrates an example procedure 1000 of access points transmitting "CTS-to-Self" frames to cover transmission of an EF or a CVS in accordance with certain aspects of the present disclosure. At a first step, each AP enabled by the LRE may obtain an interval of transmission of the EF and the CVS by the LRE. At a second step, at a time instant T before the scheduled arrival of the CVS or EF, the AP may transmit a "CTS-to-Self" or any other frame with a duration field setting that is long enough to cover at least duration up to and including the transmission time of the EF and/or the CVS. In an aspect, the Carrier Sense Multiple Access (CSMA) contention procedure may be utilized for transmission of the "CTS-to-Self" message. In addition, the time instant T may be equal to a sum of a constant value and a random value to ensure that different APs do not collide in transmitting the "CTS-to-Self" messages. A STA receiving the "CTS-to-Self" message may refrain from TVWS communication for a period of time indicated in the duration field.

It should be noted that the EF/CVS may be transmitted by contention, so the exact time may not be known a priori. Therefore, the APs may set the duration field with sufficient margin to account for the contention time. At a last step, once the EF or CVS has been transmitted, the AP may then transmit a Contention-Free End (CF-End) frame to recover any of the duration that it may over-reserved. A STA receiving the CF-End frame may be configured to reset its Network Allocation Vector (NAV) counter based on the received CF-End frame, as illustrated in FIG. 10.

Scheduling of CVS Messages for Station in Power Save Mode

In an aspect of the present disclosure, a low-rate enabler may tune to all the channels of APs that it has enabled to send the CVS signal for maintaining enablement of the APs and STAs. At initial enablement, the low-rate enabler may send to the AP on each channel the period of the CVS signal on that channel. The AP may use the knowledge of that period to wake up sleeping STAs, so that they may be able to receive the CVS signal and maintain their enablement.

In an aspect of the present disclosure, the AP may transmit one or more traffic indication map (TIM) messages and delivery traffic indication map (DTIM) messages on a regular basis. Inside each TIM, a counter may be present that counts down to the next DTIM. The AP may use this structure to schedule transmission of a DTIM immediately before transmitting a CVS message. Inside the DTIM message, the AP may set a broadcast bit indicating that a broadcast signal (i.e., the CVS message) will be transmitted. In the TVWS, the STA may wake up to receive the CVS when the STA receives the DTIM with the broadcast bit set.

Figure 11:
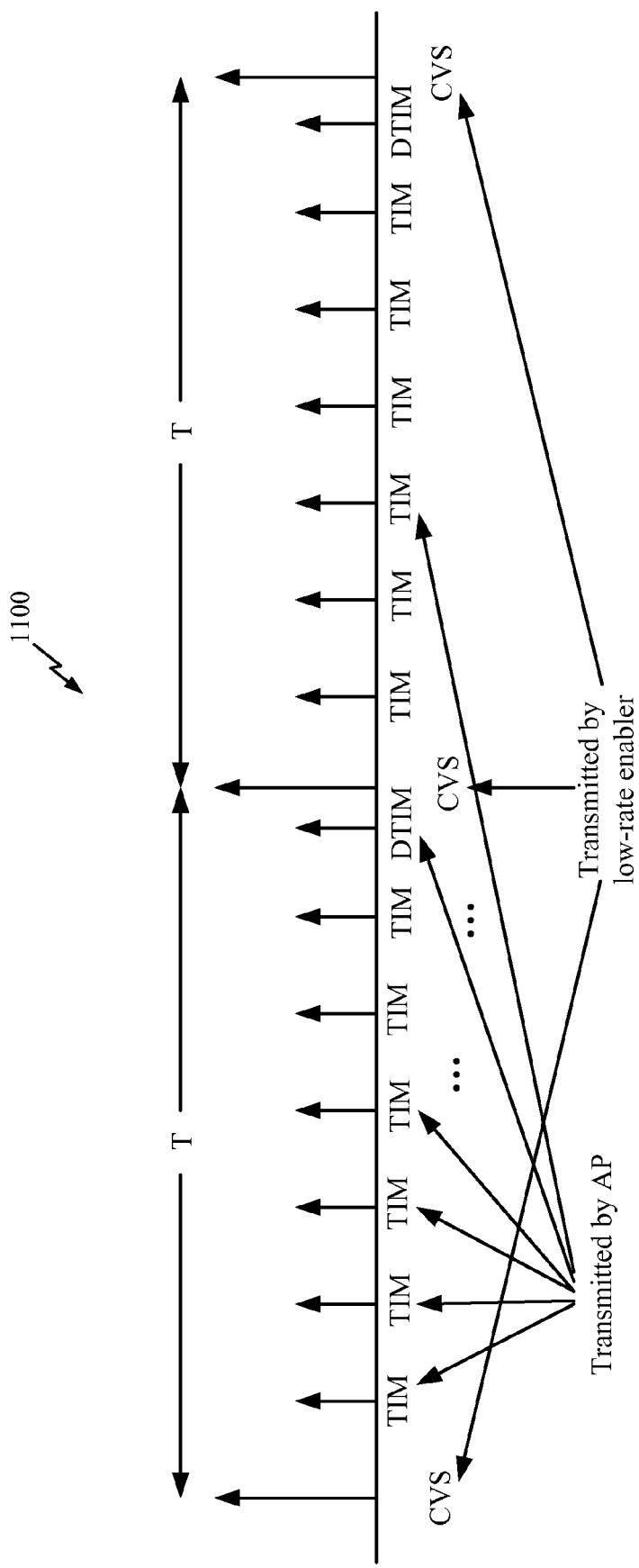
FIG. 11 illustrates an example of periodic contact verification signal (CVS) message, traffic indication map (TIM) messages and delivery traffic indication map (DTIM) message in accordance with certain aspects of the present disclosure.

FIG. 11 illustrates an example process 1100 of the periodic CVS message, TIM and DTIM messages. This process may work as follows. An AP may utilize the DTIM that is just prior to the time of arrival of the CVS to schedule wakening of STAs that are in a sleep state. The AP may set a broadcast bit in the DTIM message. All the STAs may wake up at the DTIM, read the broadcast bit and stay awake until they receive the CVS message. In an aspect, the STAs may wake up to listen to some of the TIM messages and read the down counter to determine when the next DTIM is scheduled.

In an aspect, once the CVS message has been transmitted, the AP may transmit a broadcast message indicating the CVS has been transmitted. This may permit the STAs to be put back to the sleep state, if there is no other data waiting for them.

The low-rate enabler may execute the above CVS procedure on all the channels that it has enabled an AP. In an aspect, the times for transmitting the CVS signals may be offset on each of the channels so the low-rate enabler may have enough time to tune to each of the channels.

Low-Rate Physical (PHY) Layer

In accordance with certain aspects of the present disclosure, a low-rate enabler, Mode I APs and Mode I STAs may utilize several possible low-rate PHYs in order to provide an initial TVWS communication enablement and maintain the TVWS enablement with a CVS signal.

In one aspect, a direct sequence spread spectrum (DSSS) PHY with a low data rate may provide for long-range operation and a high chip rate to spread the spectrum over the majority of 6 MHz TV channel to permit transmission at close to a maximum transmit power. Another possibility can be to use the 1 MHz IEEE 802.11 based PHY with the time scale of the modulation and chipping sequence scaled up by approximately the factor of four so that the data rate may drop to 250 Kb/s and the bandwidth may drop to approximately 5 MHz. At this data rate, the coverage of this PHY layer signaling in the TV white space may be large.

According to certain aspects of the present disclosure, a lower data rate may be obtained by decreasing the data rate of the 1 Mbits per second DSSS 802.11 PHY by a factor of two or four and then scaling from 20 MHz down to 5 MHz resulting in a data rate of 125 Kbits per second and 62.5 Kbits per second, respectively.

According to certain aspects of the present disclosure, a low data rate PHY may be obtained by using a repetition code in an OFDM PHY to decrease the data rate while maintaining the full bandwidth. Other low-rate PHY designs may also be possible.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 700, 800 and 900 illustrated in FIGS. 7, 8 and 9 correspond to components 700A, 800A and 900A illustrated in FIGS. 7A, 8A and 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for determining may comprise an application specific integrated circuit, e.g., the TX data processor 210 from FIG. 2 of the access point 110, the RX data processor 242 from FIG. 2 of the access point 110, the RX data processor 270 from FIG. 2 of the user terminal 120, the TX data processor 288 from FIG. 2 of the user terminal 120, or the processor 304 from FIG. 3 of the wireless device 302. The means for obtaining may comprise an application specific integrated circuit, e.g., the TX data processor 210, the RX data processor 242, the RX data processor 270, the TX data processor 288, or the processor 304. The means for generating may comprise an application specific integrated circuit, e.g., the TX data processor 210, the RX data processor 242, the RX data processor 270, the TX data processor 288, or the processor 304. The means for transmitting may comprise a transceiver, e.g., the transceiver 222 from FIG. 2 of the access point 110, the transceiver 254 from FIG. 2 of the user terminal 120, or the transmitter 310 from FIG. 3 of the wireless device 302. The means for establishing may comprise a transceiver, e.g., the transceiver 222, the transceiver 254, or the transceiver 314 from FIG. 3 of the wireless device 302. The means for communicating may comprise an application specific integrated circuit, e.g., the TX data processor 210, the RX data processor 242, the RX data processor 270, the TX data processor 288, or the processor 304. The means for selecting may comprise an application specific integrated circuit, e.g., the TX data processor 210, the RX data processor 242, the RX data processor 270, the TX data processor 288, or the processor 304. The means for receiving may comprise a transceiver, e.g., the transceiver 222, the transceiver 254, or the receiver 312 from FIG. 3 of the wireless device 302. The means for including may comprise an application specific integrated circuit, e.g., the TX data processor 210, the RX data processor 242, the RX data processor 270, the TX data processor 288, or the processor 304. The means for tuning may comprise an application specific integrated circuit, e.g., the TX data processor 210, the RX data processor 242, the RX data processor 270, the TX data processor 288, or the processor 304. The means for searching may comprise an application specific integrated circuit, e.g., the TX data processor 210, the RX data processor 242, the RX data processor 270, the TX data processor 288, or the processor 304. The means for detecting may comprise an application specific integrated circuit, e.g., the TX data processor 210, the RX data processor 242, the RX data processor 270, the TX data processor 288, or the processor 304. The means for continuing may comprise an application specific integrated circuit, e.g., the TX data processor 210, the RX data processor 242, the RX data processor 270, the TX data processor 288, or the processor 304. The means for switching may comprise an application specific integrated circuit, e.g., the TX data processor 210, the RX data processor 242, the RX data processor 270, the TX data processor 288, or the processor 304. The means for performing active scanning may comprise an application specific integrated circuit, e.g., the TX data processor 210, the RX data processor 242, the RX data processor 270, the TX data processor 288, or the processor 304. The means for performing passive scanning may comprise an application specific integrated circuit, e.g., the TX data processor 210, the RX data processor 242, the RX data processor 270, the TX data processor 288, or the processor 304. The means for waking up may comprise an application specific integrated circuit, e.g., the TX data processor 210, the RX data processor 242, the RX data processor 270, the TX data processor 288, or the processor 304. The means for refraining may comprise an application specific integrated circuit, e.g., the TX data processor 210, the RX data processor 242, the RX data processor 270, the TX data processor 288, or the processor 304. The means for reading may comprise an application specific integrated circuit, e.g., the TX data processor 210, the RX data processor 242, the RX data processor 270, the TX data processor 288, or the processor 304. The means for resetting may comprise an application specific integrated circuit, e.g., the TX data processor 210, the RX data processor 242, the RX data processor 270, the TX data processor 288, or the processor 304. The means for putting may comprise an application specific integrated circuit, e.g., the TX data processor 210, the RX data processor 242, the RX data processor 270, the TX data processor 288, or the processor 304. The means for modulating may comprise an application specific integrated circuit, e.g., the TX data processor 210, the TX data processor 288, or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/ or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
    a first circuit configured to search a plurality of channels supporting wireless communication for a signal transmitted from another apparatus on a first channel of the channels, wherein the signal is capable of reaching a plurality of apparatuses for advertising an enablement for the wireless communication;
    a second circuit configured to detect, based on the search, the signal and the first channel; and
    a transceiver configured to transmit, to the other apparatus upon the detection, a request for the enablement using the first channel.

2. The apparatus of claim 1, wherein the transceiver is also configured to:
    transmit, to the other apparatus, an identifier (ID) of the apparatus along with the request.

3. The apparatus of claim 1, wherein the plurality of channels supporting wireless communication comprise a plurality of television white space (TVWS) channels supporting TVWS communication, and wherein enablement for the wireless communication comprises enablement for the TVWS communication.

4. The apparatus of claim 3, wherein the transceiver is also configured to:
    receive, in response to the request, at least one of a first list of channels of the plurality of TVWS channels available for use by the apparatus, or a second list of channels of the plurality of TVWS channels being in use by a subset of the apparatuses, and the apparatus further comprising
    a third circuit configured to select, from the at least one of first list or second list, a second channel for the TVWS communication by the apparatus.

5. The apparatus of claim 4, wherein the transceiver is also configured to:
    transmit, to the other apparatus, a center frequency and a bandwidth of the second channel.

6. The apparatus of claim 4, wherein the transceiver is also configured to:
    receive, from the other apparatus, a message with information about periodicity of transmitting a contact verification signal (CVS) on the second channel;
    receive, with the periodicity, the CVS on the second channel; and
    continue the TVWS communication on the second channel based on reception of the CVS.

7. The apparatus of claim 6, wherein the transceiver is also configured to:
    switch from the second channel to the first channel, if the CVS was not received for a period of time; and
    transmit, using the first channel, another request for the enablement.

8. The apparatus of claim 6, wherein the transceiver is also configured to:
    transmit, on the second channel according to the periodicity, one or more traffic indication map (TIM) messages and a delivery traffic indication map (DTIM) message before the CVS was transmitted on the second channel from the other apparatus, and wherein
    each of the TIM messages comprises a counter that counts down to the transmission of the DTIM message, and
    the DTIM message is transmitted immediately before the CVS transmission.

9. The apparatus of claim 6, wherein the transceiver is also configured to:
    transmit, upon receiving the CVS, a broadcast message indicating that the CVS was transmitted from the other apparatus.

10. The apparatus of claim 4, wherein the transceiver is also configured to:
    receive, from the other apparatus, a message comprising a schedule of receiving a contact verification signal (CVS) on the second channel;
    refrain, according to the schedule, from the TVWS communication on the second channel;
    receive the CVS according to the schedule; and
    continue the TVWS communication on the second channel after receiving the CVS.

11. The apparatus of claim 10, wherein the transceiver is also configured to:
    transmit, in response to the message, a broadcast message with the schedule to one or more of the apparatuses associated with the apparatus.

12. The apparatus of claim 10, wherein the transceiver is also configured to:
    transmit a Contention-Free End (CF-End) frame after the CVS was transmitted from the other apparatus.

13. The apparatus of claim 10, wherein:
    the transceiver is also configured to transmit a Clear-to-send (CTS)-to-Self message according to the schedule, and
    the CTS-to-Self message comprises a duration field indicating a period of time equal to at least duration of transmitting the CVS from the other apparatus.

14. The apparatus of claim 3, wherein the transceiver is also configured to:
receive, on the first channel, a message with a schedule of transmitting the signal from the other apparatus, if the first channel is used for the TVWS communication by the apparatus and a subset of the apparatuses; and
refrain from the TVWS communication according to the schedule.

15. The apparatus of claim 14, wherein the transceiver is also configured to:
transmit, to one or more apparatuses from the subset associated with the apparatus, another message with the schedule.

16. The apparatus of claim 14, wherein:
the transceiver is also configured to transmit a Clear-to-send (CTS)-to-Self message according to the schedule, and
the CTS-to-Self message comprises a duration field indicating a period of time equal to at least duration of transmitting the signal from the other apparatus.

17. The apparatus of claim 1, wherein:
the signal comprises a direct sequence spread spectrum (DSSS) signal.

18. The apparatus of claim 1, wherein:
a data rate of the signal is approximately 10 Kbits per second or 100 Kbits per second, and
a bandwidth of the signal is approximately 5 MHz or 6 MHz.

19. The apparatus of claim 1, wherein:
a data rate of the signal is approximately 250 Kbits per second, 125 Kbits per second, or 62.5 Kbits per second, and
a bandwidth of the signal is approximately 5 MHz.

20. The apparatus of claim 1, wherein:
the transceiver is also configured to transmit a beacon comprising information about the first channel, and
the information comprises at least one of a center frequency of the first channel, a bandwidth of the first channel, or an address of the other apparatus.

21. A method for wireless communications, comprising:
searching, at an apparatus, a plurality of channels supporting wireless communication for a signal transmitted from another apparatus on a first channel of the channels, wherein the signal is capable of reaching a plurality of apparatuses for advertising an enablement for the wireless communication;
detecting, based on the search, the signal and the first channel; and
transmitting, to the other apparatus upon the detection, a request for the enablement using the first channel.

22. The method of claim 21, further comprising:
transmitting, to the other apparatus, an identifier (ID) of the apparatus along with the request.

23. The method of claim 21, wherein the plurality of channels supporting wireless communication comprise a plurality of television white space (TVWS) channels supporting TVWS communication, and wherein enablement for the wireless communication comprises enablement for the TVWS communication.

24. The method of claim 23, further comprising:
receiving, in response to the request, at least one of a first list of channels of the plurality of TVWS channels available for use by the apparatus, or a second list of channels of the plurality of TVWS channels being in use by a subset of the apparatuses; and
selecting, from the at least one of first list or second list, a second channel for the TVWS communication by the apparatus.

25. The method of claim 24, further comprising:
transmitting, to the other apparatus, a center frequency and a bandwidth of the second channel.

26. The method of claim 24, further comprising:
receiving, from the other apparatus, a message with information about periodicity of transmitting a contact verification signal (CVS) on the second channel;
receiving, with the periodicity, the CVS on the second channel; and
continuing the TVWS communication on the second channel based on reception of the CVS.

27. The method of claim 26, further comprising:
switching from the second channel to the first channel, if the CVS was not received for a period of time; and
transmitting, using the first channel, another request for the enablement.

28. The method of claim 26, further comprising:
transmitting, on the second channel according to the periodicity, one or more traffic indication map (TIM) messages and a delivery traffic indication map (DTIM) message before the CVS was transmitted on the second channel from the other apparatus, wherein
each of the TIM messages comprises a counter that counts down to the transmission of the DTIM message, and
the DTIM message is transmitted immediately before the CVS transmission.

29. The method of claim 26, further comprising:
transmitting, upon receiving the CVS, a broadcast message indicating that the CVS was transmitted from the other apparatus.

30. The method of claim 24, further comprising:
receiving, from the other apparatus, a message comprising a schedule of receiving a contact verification signal (CVS) on the second channel;
refraining, according to the schedule, from the TVWS communication on the second channel;
receiving the CVS according to the schedule; and
continuing the TVWS communication on the second channel after receiving the CVS.

31. The method of claim 30, further comprising:
transmitting, in response to the message, a broadcast message with the schedule to one or more of the apparatuses associated with the apparatus.

32. The method of claim 30, further comprising:
transmitting a Contention-Free End (CF-End) frame after the CVS was transmitted from the other apparatus.

33. The method of claim 30, further comprising:
transmitting a Clear-to-send (CTS)-to-Self message according to the schedule, wherein
the CTS-to-Self message comprises a duration field indicating a period of time equal to at least duration of transmitting the CVS from the other apparatus.

34. The method of claim 23, further comprising:
receiving, on the first channel, a message with a schedule of transmitting the signal from the other apparatus, if the first channel is used for the TVWS communication by the apparatus and a subset of the apparatuses; and
refraining from the TVWS communication according to the schedule.

35. The method of claim 34, further comprising:
transmitting, to one or more apparatuses from the subset associated with the apparatus, another message with the schedule.

36. The method of claim 34, further comprising:
transmitting a Clear-to-send (CTS)-to-Self message according to the schedule, wherein
the CTS-to-Self message comprises a duration field indicating a period of time equal to at least duration of transmitting the signal from the other apparatus.

37. The method of claim 21, wherein:
the signal comprises a direct sequence spread spectrum (DSSS) signal.

38. The method of claim 21, wherein:
a data rate of the signal is approximately 10 Kbits per second or 100 Kbits per second, and
a bandwidth of the signal is approximately 5 MHz or 6 MHz.

39. The method of claim 21, wherein:
a data rate of the signal is approximately 250 Kbits per second, 125 Kbits per second, or 62.5 Kbits per second, and
a bandwidth of the signal is approximately 5 MHz.

40. The method of claim 21, further comprising:
transmitting a beacon comprising information about the first channel, wherein
the information comprises at least one of a center frequency of the first channel, a bandwidth of the first channel, or an address of the other apparatus.

41. An apparatus for wireless communications, comprising:
means for searching a plurality of channels supporting wireless communication for a signal transmitted from another apparatus on a first channel of the channels, wherein the signal is capable of reaching a plurality of apparatuses for advertising an enablement for the wireless communication;
means for detecting, based on the search, the signal and the first channel; and
means for transmitting, to the other apparatus upon the detection, a request for the enablement using the first channel.

42. The apparatus of claim 41, wherein the means for transmitting is further configured to:
transmit, to the other apparatus, an identifier (ID) of the apparatus along with the request.

43. The apparatus of claim 41, wherein the plurality of channels supporting wireless communication comprise a plurality of television white space (TVWS) channels supporting TVWS communication, and wherein enablement for the wireless communication comprises enablement for the TVWS communication.

44. The apparatus of claim 43, further comprising:
means for receiving, in response to the request, at least one of a first list of channels of the plurality of TVWS channels available for use by the apparatus, or a second list of channels of the plurality of TVWS channels being in use by a subset of the apparatuses; and
means for selecting, from the at least one of first list or second list, a second channel for the TVWS communication by the apparatus.

45. The apparatus of claim 44, wherein the means for transmitting is further configured to:
transmit, to the other apparatus, a center frequency and a bandwidth of the second channel.

46. The apparatus of claim 44, wherein the means for receiving is further configured to:
receive, from the other apparatus, a message with information about periodicity of transmitting a contact verification signal (CVS) on the second channel; and
receive, with the periodicity, the CVS on the second channel, and the apparatus further comprising
means for continuing the TVWS communication on the second channel based on reception of the CVS.

47. The apparatus of claim 46, further comprising:
means for switching from the second channel to the first channel, if the CVS was not received for a period of time, and wherein the means for transmitting is further configured to
transmit, using the first channel, another request for the enablement.

48. The apparatus of claim 46, wherein the means for transmitting is further configured to:
transmit, on the second channel according to the periodicity, one or more traffic indication map (TIM) messages and a delivery traffic indication map (DTIM) message before the CVS was transmitted on the second channel from the other apparatus, and wherein
each of the TIM messages comprises a counter that counts down to the transmission of the DTIM message, and
the DTIM message is transmitted immediately before the CVS transmission.

49. The apparatus of claim 48, wherein the means for transmitting is further configured to:
transmit, upon receiving the CVS, a broadcast message indicating that the CVS was transmitted from the other apparatus.

50. The apparatus of claim 44, wherein the means for receiving is further configured to:
receive, from the other apparatus, a message comprising a schedule of receiving a contact verification signal (CVS) on the second channel; and
receive the CVS according to the schedule, and the apparatus further comprising
means for refraining, according to the schedule, from the TVWS communication on the second channel, and
means for continuing the TVWS communication on the second channel after receiving the CVS.

51. The apparatus of claim 50, wherein the means for transmitting is further configured to:
transmit, in response to the message, a broadcast message with the schedule to one or more of the apparatuses associated with the apparatus.

52. The apparatus of claim 50, wherein the means for transmitting is further configured to:
transmit a Contention-Free End (CF-End) frame after the CVS was transmitted from the other apparatus.

53. The apparatus of claim 50, wherein the means for transmitting is further configured to:
transmit a Clear-to-send (CTS)-to-Self message according to the schedule, and wherein
the CTS-to-Self message comprises a duration field indicating a period of time equal to at least duration of transmitting the CVS from the other apparatus.

54. The apparatus of claim 43, further comprising:
means for receiving, on the first channel, a message with a schedule of transmitting the signal from the other apparatus, if the first channel is used for the TVWS communication by the apparatus and a subset of the apparatuses; and
means for refraining from the TVWS communication according to the schedule.

55. The apparatus of claim 54, wherein the means for transmitting is further configured to:
transmit, to one or more apparatuses from the subset associated with the apparatus, another message with the schedule.

56. The apparatus of claim 54, wherein the means for transmitting is further configured to:
  transmit a Clear-to-send (CTS)-to-Self message according to the schedule, and wherein
  the CTS-to-Self message comprises a duration field indicating a period of time equal to at least duration of transmitting the signal from the other apparatus.

57. The apparatus of claim 39, wherein the means for transmitting is further configured to:
  transmit a beacon comprising information about the first channel, and wherein
  the information comprises at least one of a center frequency of the first channel, a bandwidth of the first channel, or an address of the other apparatus.

58. A non-transitory computer-readable medium comprising instructions executable to:
  search, at an apparatus, a plurality of channels supporting wireless communication for a signal transmitted from another apparatus on a first channel of the channels, wherein the signal is capable of reaching a plurality of apparatuses for advertising an enablement for the wireless communication;
  detect, based on the search, the signal and the first channel; and
  transmit, to the other apparatus upon the detection, a request for the enablement using the first channel.

59. An access point, comprising:
  at least one antenna;
  a first circuit configured to search a plurality of channels supporting wireless communication for a signal transmitted from another access point on a first channel of the channels, wherein the signal is capable of reaching a plurality of wireless nodes for advertising an enablement for the wireless communication;
  a second circuit configured to detect, based on the search, the signal and the first channel; and
  a transceiver configured to transmit, to the other access point upon the detection via the at least one antenna, a request for the enablement using the first channel.

60. An apparatus for wireless communications, comprising:
  a first circuit configured to search a plurality of channels supporting wireless communication for a signal transmitted from another apparatus on a first channel of the channels, wherein the signal is capable of reaching a plurality of apparatuses for advertising an enablement for the wireless communication;
  a transceiver configured to transmit, to the other apparatus using the first channel upon detecting the signal and the first channel, a request for the enablement, wherein the transceiver is also configured to
  receive, from the other apparatus in response to the request, a list of channels of the plurality of channels being in use by a subset of the apparatuses, and wherein the first circuit is also configured to
  search, on channels from the list, for a communicating apparatus of the subset.

61. The apparatus of claim 60, wherein the plurality of channels supporting wireless communication comprise a plurality of television white space (TVWS) channels supporting TVWS communication, and wherein enablement for the wireless communication comprises enablement for the TVWS communication.

62. The apparatus of claim 61, wherein the transceiver is also configured to:
  receive, from the other apparatus in response to the request, another list of channels of the plurality of TVWS channels not being in use by the plurality of apparatuses.

63. The apparatus of claim 61, further comprising:
  a second circuit configured to perform, upon detecting the communicating apparatus, an association procedure with the communicating apparatus, and wherein the transceiver is also configured to
  establish, after the association procedure, the TVWS communication with the communicating apparatus on a second channel from the list.

64. The apparatus of claim 63, wherein the transceiver is also configured to:
  receive, from the other apparatus, a message with information about periodicity of transmitting a contact verification signal (CVS) on the second channel;
  receive, with the periodicity, the CVS on the second channel; and
  continue the TVWS communication on the second channel based on reception of the CVS.

65. The apparatus of claim 64, wherein the transceiver is also configured to:
  receive, from the communicating apparatus, another message comprising a schedule of receiving the CVS on the second channel;
  refrain, according to the schedule, from the TVWS communication on the second channel during reception of the CVS; and
  receive the CVS according to the schedule.

66. The apparatus of claim 64, wherein the transceiver is also configured to:
  receive, from the communicating apparatus with the periodicity, a Clear-to-send (CTS)-to-Self message; and
  refrain, based on the CTS-to-Self message, from the TVWS communication on the second channel during reception of the CVS.

67. The apparatus of claim 64, wherein the transceiver is also configured to:
  switch from the second channel to the first channel, if the CVS was not received for a period of time; and
  transmit, to the other apparatus using the first channel, another request for the enablement.

68. The apparatus of claim 64, wherein the transceiver is also configured to:
  receive, on the second channel from the communicating apparatus according to the periodicity, one or more traffic indication map (TIM) messages and a delivery traffic indication map (DTIM) message before the CVS was transmitted on the second channel from the other apparatus, and wherein
  each of the TIM messages comprises a counter that counts down to transmission of the DTIM message from the communicating apparatus, and
  the DTIM message is received immediately before receiving the CVS transmission.

69. The apparatus of claim 64, wherein the transceiver is also configured to:
  receive, from the communicating apparatus, a Contention-Free End (CF-End) frame after the CVS was transmitted from the other apparatus, and the apparatus further comprising
  a third circuit configured to reset a Network Allocation Vector (NAV) counter based on the CF-End frame.

70. The apparatus of claim 61, wherein the transceiver is, upon detecting the communicating apparatus, also configured to:

receive, on the first channel from the communicating apparatus, a message with a schedule of transmitting the signal from the other apparatus, if the first channel is used for the TVWS communication by the apparatus and the communicating apparatus; and refrain from the TVWS communication according to the schedule.

71. The apparatus of claim 61, wherein the transceiver is, upon detecting the communicating apparatus, also configured to:

receive, on the first channel from the communicating apparatus, a Clear-to-send (CTS)-to-Self message transmitted according to a schedule of transmitting the signal from the other apparatus, if the first channel is used for the TVWS communication by the apparatus and the communicating apparatus; and refrain from the TVWS communication based on the CTS-to-Self message.

72. The apparatus of claim 71, wherein:

the CTS-to-Self message comprises a duration field indicating a period of time equal to at least duration of transmitting the signal from the other apparatus, and the transceiver is also configured to refrain from the TVWS communication for the period of time.

73. The apparatus of claim 60, wherein the first circuit is also configured to:

perform active scanning during the search for the communicating apparatus, or perform passive scanning during the search for the communicating apparatus.

74. The apparatus of claim 60, wherein:

the signal comprises a direct sequence spread spectrum (DSSS) signal.

75. The apparatus of claim 60, wherein:

a data rate of the signal is approximately 10 Kbits per second or 100 Kbits per second, and a bandwidth of the signal is approximately 5 MHz or 6 MHz.

76. The apparatus of claim 60, wherein:

a data rate of the signal is approximately 250 Kbits per second, 125 Kbits per second, or 62.5 Kbits per second, and a bandwidth of the signal is approximately 5 MHz.

77. The apparatus of claim 60, wherein the transceiver is also configured to:

receive a beacon comprising information about the first channel, and the apparatus further comprising a second circuit configured to detect the signal and the first channel based on the beacon.

78. The apparatus of claim 77, wherein the information comprises at least one of a center frequency of the first channel, a bandwidth of the first channel, or an address of the other apparatus.

79. The apparatus of claim 60, wherein the transceiver is, upon detecting the communicating apparatus, also configured to:

receive, from the communicating apparatus, a Contention-Free End (CF-End) frame after the signal was transmitted from the other apparatus, and the apparatus further comprising a third circuit configured to reset a Network Allocation Vector (NAV) counter based on the CF-End frame.

80. The apparatus of claim 60, wherein the signal comprises an Orthogonal Frequency Division Multiplexing (OFDM) signal with repetition codes.

81. A method for wireless communications, comprising:

searching, at an apparatus, a plurality of channels supporting wireless communication for a signal transmitted from another apparatus on a first channel of the channels, wherein the signal is capable of reaching a plurality of apparatuses for advertising an enablement for the wireless communication;

transmitting, to the other apparatus using the first channel upon detecting the signal and the first channel, a request for the enablement;

receiving, from the other apparatus in response to the request, a list of channels of the plurality of channels being in use by a subset of the apparatuses; and searching, on channels from the list, for a communicating apparatus of the subset.

82. The method of claim 81, wherein the plurality of channels supporting wireless communication comprise a plurality of television white space (TVWS) channels supporting TVWS communication, and wherein enablement for the wireless communication comprises enablement for the TVWS communication.

83. The method of claim 82, further comprising:

receiving, from the other apparatus in response to the request, another list of channels of the plurality of TVWS channels not being in use by the plurality of apparatuses.

84. The method of claim 82, further comprising:

performing, upon detecting the communicating apparatus, an association procedure with the communicating apparatus; and establishing, after the association procedure, the TVWS communication with the communicating apparatus on a second channel from the list.

85. The method of claim 84, further comprising:

receiving, from the other apparatus, a message with information about periodicity of transmitting a contact verification signal (CVS) on the second channel;

receiving, with the periodicity, the CVS on the second channel; and continuing the TVWS communication on the second channel based on reception of the CVS.

86. The method of claim 85, further comprising:

receiving, from the communicating apparatus, another message comprising a schedule of receiving the CVS on the second channel;

refraining, according to the schedule, from the TVWS communication on the second channel during reception of the CVS; and receiving the CVS according to the schedule.

87. The method of claim 85, further comprising:

receiving, from the communicating apparatus with the periodicity, a Clear-to-send (CTS)-to-Self message; and refraining, based on the CTS-to-Self message, from the TVWS communication on the second channel during reception of the CVS.

88. The method of claim 85, further comprising:

switching from the second channel to the first channel, if the CVS was not received for a period of time; and transmitting, to the other apparatus using the first channel, another request for the enablement.

89. The method of claim 85, further comprising:

receiving, on the second channel from the communicating apparatus according to the periodicity, one or more traffic indication map (TIM) messages and a delivery traffic indication map (DTIM) message before the CVS was transmitted on the second channel from the other apparatus, wherein each of the TIM messages comprises a counter that counts down to transmission of the DTIM message from the communicating apparatus, and
the DTIM message is received immediately before receiving the CVS transmission.

90. The method of claim 85, further comprising:
receiving, from the communicating apparatus, a Contention-Free End (CF-End) frame after the CVS was transmitted from the other apparatus; and
resetting a Network Allocation Vector (NAV) counter based on the CF-End frame.

91. The method of claim 82, further comprising:
upon detecting the communicating apparatus, receiving, on the first channel from the communicating apparatus, a message with a schedule of transmitting the signal from the other apparatus, if the first channel is used for the TVWS communication by the apparatus and the communicating apparatus; and
refraining from the TVWS communication according to the schedule.

92. The method of claim 82, further comprising:
upon detecting the communicating apparatus, receiving, on the first channel from the communicating apparatus, a Clear-to-send (CTS)-to-Self message transmitted according to a schedule of transmitting the signal from the other apparatus, if the first channel is used for the TVWS communication by the apparatus and the communicating apparatus; and
refraining from the TVWS communication based on the CTS-to-Self message.

93. The method of claim 92, wherein:
the CTS-to-Self message comprises a duration field indicating a period of time equal to at least duration of transmitting the signal from the other apparatus, and the method further comprising
refraining from the TVWS communication for the period of time.

94. The method of claim 81, further comprising:
performing active scanning during the search for the communicating apparatus, or
performing passive scanning during the search for the communicating apparatus.

95. The method of claim 81, wherein:
the signal comprises a direct sequence spread spectrum (DSSS) signal.

96. The method of claim 81, wherein:
a data rate of the signal is approximately 10 Kbits per second or 100 Kbits per second, and
a bandwidth of the signal is approximately 5 MHz or 6 MHz.

97. The method of claim 81, wherein:
a data rate of the signal is approximately 250 Kbits per second, 125 Kbits per second, or 62.5 Kbits per second, and
a bandwidth of the signal is approximately 5 MHz.

98. The method of claim 81, further comprising:
receiving a beacon comprising information about the first channel; and
detecting the signal and the first channel based on the beacon.

99. The method of claim 98, wherein the information comprises at least one of a center frequency of the first channel, a bandwidth of the first channel, or an address of the other apparatus.

100. The method of claim 81, further comprising:
upon detecting the communicating apparatus, receiving, from the communicating apparatus, a Contention-Free End (CF-End) frame after the signal was transmitted from the other apparatus; and
resetting a Network Allocation Vector (NAV) counter based on the CF-End frame.

101. The method of claim 81, wherein the signal comprises an Orthogonal Frequency Division Multiplexing (OFDM) signal with repetition codes.

102. An apparatus for wireless communications, comprising:
means for searching a plurality of channels supporting wireless communication for a signal transmitted from another apparatus on a first channel of the channels, wherein the signal is capable of reaching a plurality of apparatuses for advertising an enablement for the wireless communication;
means for transmitting, to the other apparatus using the first channel upon detecting the signal and the first channel, a request for the enablement;
means for receiving, from the other apparatus in response to the request, a list of channels of the plurality of channels being in use by a subset of the apparatuses; and
means for searching, on channels from the list, for a communicating apparatus of the subset.

103. The apparatus of claim 102, wherein the plurality of channels supporting wireless communication comprise a plurality of television white space (TVWS) channels supporting TVWS communication, and wherein enablement for the wireless communication comprises enablement for the TVWS communication.

104. The apparatus of claim 103, wherein the means for receiving is further configured to:
receive, from the other apparatus in response to the request, another list of channels of the plurality of TVWS channels not being in use by the plurality of apparatuses.

105. The apparatus of claim 103, further comprising:
means for performing, upon detecting the communicating apparatus, an association procedure with the communicating apparatus; and
means for establishing, after the association procedure, the TVWS communication with the communicating apparatus on a second channel from the list.

106. The apparatus of claim 105, wherein the means for receiving is further configured to:
receive, from the other apparatus, a message with information about periodicity of transmitting a contact verification signal (CVS) on the second channel; and
receive, with the periodicity, the CVS on the second channel, and the apparatus further comprising
means for continuing the TVWS communication on the second channel based on reception of the CVS.

107. The apparatus of claim 106, wherein the means for receiving is further configured to:
receive, from the communicating apparatus, another message comprising a schedule of receiving the CVS on the second channel; and
receive the CVS according to the schedule, and the apparatus further comprising
means for refraining, according to the schedule, from the TVWS communication on the second channel during reception of the CVS.

108. The apparatus of claim 106, wherein the means for receiving is further configured to:
receive, from the communicating apparatus with the periodicity, a Clear-to-send (CTS)-to-Self message, and the apparatus further comprising means for refraining, based on the CTS-to-Self message, from the TVWS communication on the second channel during reception of the CVS.

109. The apparatus of claim 106, further comprising:
means for switching from the second channel to the first channel, if the CVS was not received for a period of time, wherein the means for transmitting is further configured to
transmit, to the other apparatus using the first channel, another request for the enablement.

110. The apparatus of claim 106, wherein the means for receiving is further configured to:
receive, on the second channel from the communicating apparatus according to the periodicity, one or more traffic indication map (TIM) messages and a delivery traffic indication map (DTIM) message before the CVS was transmitted on the second channel from the other apparatus, and wherein
each of the TIM messages comprises a counter that counts down to transmission of the DTIM message from the communicating apparatus, and
the DTIM message is received immediately before receiving the CVS transmission.

111. The apparatus of claim 106, wherein the means for receiving is further configured to:
receive, from the communicating apparatus, a Contention-Free End (CF-End) frame after the CVS was transmitted from the other apparatus, and the apparatus further comprising
means for resetting a Network Allocation Vector (NAV) counter based on the CF-End frame.

112. The apparatus of claim 103, wherein the means for receiving is, upon detecting the communicating apparatus, further configured to:
receive, on the first channel from the communicating apparatus, a message with a schedule of transmitting the signal from the other apparatus, if the first channel is used for the TVWS communication by the apparatus and the communicating apparatus, and the apparatus further comprising
means for refraining from the TVWS communication according to the schedule.

113. The apparatus of claim 103, wherein the means for receiving is, upon detecting the communicating apparatus, further configured to:
receive, on the first channel from the communicating apparatus, a Clear-to-send (CTS)-to-Self message transmitted according to a schedule of transmitting the signal from the other apparatus, if the first channel is used for the TVWS communication by the apparatus and the communicating apparatus, and the apparatus further comprising
means for refraining from the TVWS communication based on the CTS-to-Self message.

114. The apparatus of claim 113, wherein:
the CTS-to-Self message comprises a duration field indicating a period of time equal to at least duration of transmitting the signal from the other apparatus, and the apparatus further comprising
means for refraining from the TVWS communication for the period of time.

115. The apparatus of claim 102, further comprising:
means for performing active scanning during the search for the communicating apparatus, or
means for performing passive scanning during the search for the communicating apparatus.

116. The apparatus of claim 102, wherein the means for receiving is further configured to:
receive a beacon comprising information about the first channel, and the apparatus further comprising
means for detecting the signal and the first channel based on the beacon.

117. The apparatus of claim 116, wherein the information comprises at least one of a center frequency of the first channel, a bandwidth of the first channel, or an address of the other apparatus.

118. The apparatus of claim 102, wherein the means for receiving is, upon detecting the communicating apparatus, further configured to:
receive, from the communicating apparatus, a Contention-Free End (CF-End) frame after the signal was transmitted from the other apparatus, and the apparatus further comprising
means for resetting a Network Allocation Vector (NAV) counter based on the CF-End frame.

119. The apparatus of claim 102, wherein the signal comprises an Orthogonal Frequency Division Multiplexing (OFDM) signal with repetition codes.

120. A non-transitory computer-readable medium comprising instructions executable to:
search, at an apparatus, a plurality of channels supporting wireless communication for a signal transmitted from another apparatus on a first channel of the channels, wherein the signal is capable of reaching a plurality of apparatuses for advertising an enablement for the wireless communication;
transmit, to the other apparatus using the first channel upon detecting the signal and the first channel, a request for the enablement;
receive, from the other apparatus in response to the request, a list of channels of the plurality of channels being in use by a subset of the apparatuses; and
search, on channels from the list, for a communicating apparatus of the subset.

121. An access terminal, comprising:
at least one antenna;
a first circuit configured to search a plurality of channels supporting wireless communication for a signal transmitted from an access point on a first channel of the channels, wherein the signal is capable of reaching a plurality of wireless nodes for advertising an enablement for the wireless communication;
a transceiver configured to transmit, via the at least one antenna to the access point using the first channel upon detecting the signal and the first channel, a request for the enablement, wherein the transceiver is also configured to
receive, via the at least one antenna from the access point in response to the request, a list of channels of the plurality of channels being in use by a subset of the wireless nodes, and wherein the first circuit is also configured to
search, on channels from the list, for another access point of the subset.

* * * * *